US012664980B2

(12) United States Patent
Choi et al.

(10) Patent No.: US 12,664,980 B2
(45) Date of Patent: Jun. 23, 2026

(54) METHOD AND SYSTEM FOR CONVERTING PLANT PROCEDURES TO VOICE INTERFACING SMART PROCEDURES

(71) Applicant: INJE UNIVERSITY INDUSTRY-ACADEMIC COOPERATION FOUNDATION, Gimhae-Si (KR)

(72) Inventors: Yongsun Choi, Busan (KR); Minh Duc Nguyen, Gimhae-Si (KR); The Kiet Hoang, Gimhae-Si (KR); Ngoc Long Ha, Gimhae-Si (KR)

(73) Assignee: INJE UNIVERSITY INDUSTRY-ACADEMIC COOPERATION FOUNDATION, Gimhae-si (KR)

( * ) Notice: Subject to any disclaimer, the term of this patent is extended or adjusted under 35 U.S.C. 154(b) by 241 days.

(21) Appl. No.: 18/551,394

(22) PCT Filed: Nov. 1, 2021

(86) PCT No.: PCT/KR2021/015599
§ 371 (c)(1),
(2) Date: Sep. 19, 2023

(87) PCT Pub. No.: WO2022/196882
PCT Pub. Date: Sep. 22, 2022

(65) Prior Publication Data
US 2024/0169980 A1 May 23, 2024

(30) Foreign Application Priority Data

Mar. 19, 2021 (KR) ........................ 10-2021-0035941
Aug. 17, 2021 (KR) ........................ 10-2021-0107849

(51) Int. Cl.
*G10L 15/18* (2013.01)
*G06Q 10/06* (2023.01)
(Continued)

(52) U.S. Cl.
CPC .......... *G10L 15/1815* (2013.01); *G10L 13/02* (2013.01); *G10L 15/02* (2013.01);
(Continued)

(58) Field of Classification Search
CPC ......... G10L 13/02; G10L 15/02; G10L 15/22; G10L 15/1815; G10L 15/30; G10L 2015/223; G10L 2015/228; G06Q 10/06
(Continued)

(56) References Cited

U.S. PATENT DOCUMENTS 6,226,612 B1 * 5/2001 Srenger ................. G10L 15/063
704/256.2
7,287,248 B1 * 10/2007 Adeeb ..................... G10L 15/22
704/E15.04
(Continued)

FOREIGN PATENT DOCUMENTS

JP 2004-030012 A 1/2004
KR 10-2006-0131930 A 12/2006
(Continued)

OTHER PUBLICATIONS

Kato, Nariaki, and Naohiro Ishii. "A creation of voice tour guide system by cell phones." Proceedings of the 10th WSEAS international conference on Computers. 2006, pp. 1-7. (Year: 2006).*
(Continued)

*Primary Examiner* — James S Wozniak
(74) *Attorney, Agent, or Firm* — Osha Bergman Watanabe & Burton LLP

(57) ABSTRACT
The present invention proposes a method and system that converts a procedure document into a smart procedure
(Continued)

system capable of voice interfacing. The system of the present invention may include a conversion module that converts the BPMN process model of a procedure expressed in XML, automatically generated via NLP-based technology, into a smart procedure system capable of voice interfacing. The conversion module may be configured as a client-server architecture composed of a mobile application client on a smart device and a server system providing backend services.

26 Claims, 32 Drawing Sheets

(51) Int. Cl.

| | |
|---|---|
| *G10L 13/02* | (2013.01) |
| *G10L 15/02* | (2006.01) |
| *G10L 15/22* | (2006.01) |
| *G10L 15/30* | (2013.01) |

(52) U.S. Cl.
CPC .............. *G10L 15/22* (2013.01); *G10L 15/30* (2013.01); *G06Q 10/06* (2013.01); *G10L 2015/223* (2013.01); *G10L 2015/228* (2013.01)

(58) Field of Classification Search
USPC ................................................ 704/270, 275
See application file for complete search history.

(56) References Cited

U.S. PATENT DOCUMENTS

| | | | | |
|---|---|---|---|---|
| 7,715,929 | B2 * | 5/2010 | Skourup ............. | G06F 3/04845 |
| | | | | 715/848 |
| 7,787,598 | B2 * | 8/2010 | Agapi ................... | H04M 3/493 |
| | | | | 379/27.04 |
| 8,595,013 | B1 * | 11/2013 | Leon ........................ | G10L 25/48 |
| | | | | 704/270.1 |
| 9,318,128 | B1 * | 4/2016 | Epstein ................... | G10L 21/10 |
| 2001/0053970 | A1 * | 12/2001 | Ford ........................ | G10L 15/26 |
| | | | | 704/E15.045 |
| 2003/0041313 | A1 * | 2/2003 | Harmon .............. | G06F 9/44505 |
| | | | | 717/121 |
| 2004/0083479 | A1 * | 4/2004 | Bondarenko ........... | G06F 9/546 |
| | | | | 719/310 |
| 2004/0093217 | A1 * | 5/2004 | Yeh ..................... | H04M 3/4936 |
| | | | | 707/E17.118 |
| 2004/0220810 | A1 * | 11/2004 | Leask ................. | H04M 3/4938 |
| | | | | 704/E15.047 |
| 2005/0075886 | A1 * | 4/2005 | LeFebvre ........... | H04M 3/4938 |
| | | | | 707/E17.102 |
| 2005/0234428 | A1 * | 10/2005 | Spohn ................... | A61M 5/007 |
| | | | | 604/533 |
| 2005/0234727 | A1 * | 10/2005 | Chiu ....................... | G10L 15/26 |
| | | | | 704/E15.044 |
| 2006/0241793 | A1 * | 10/2006 | Skourup ............. | G06F 3/04845 |
| | | | | 700/83 |
| 2007/0233495 | A1 * | 10/2007 | Agapi ...................... | G06F 8/38 |
| | | | | 704/E15.044 |
| 2008/0046254 | A1 | 2/2008 | Nuno et al. | |
| 2011/0106537 | A1 * | 5/2011 | Funyak ................. | G06F 40/143 |
| | | | | 704/260 |
| 2011/0202351 | A1 * | 8/2011 | Plocher ................... | G10L 15/26 |
| | | | | 704/E15.001 |
| 2013/0095864 | A1 * | 4/2013 | Marovets ........... | G06Q 30/0239 |
| | | | | 455/466 |
| 2014/0358549 | A1 * | 12/2014 | O'Connor ............. | H04M 3/493 |
| | | | | 704/270 |
| 2015/0142443 | A1 * | 5/2015 | Hwang ................. | G06F 40/211 |
| | | | | 704/257 |
| 2018/0052758 | A1 * | 2/2018 | Benari ................ | G06F 11/3438 |
| 2021/0004441 | A1 * | 1/2021 | Sapugay .................. | G06N 5/01 |
| 2021/0158811 | A1 * | 5/2021 | Di Fabbrizio .......... | G10L 13/00 |
| 2022/0154954 | A1 * | 5/2022 | Sinur ....................... | F24F 11/89 |
| 2022/0374645 | A1 * | 11/2022 | Santoro ................. | G06N 3/084 |

FOREIGN PATENT DOCUMENTS

| | | |
|---|---|---|
| KR | 10-2008-0011744 A | 2/2008 |
| KR | 10-2011-0114173 A | 10/2011 |
| KR | 10-2015-0001923 A | 1/2015 |
| KR | 10-2016-0038672 A | 4/2016 |

OTHER PUBLICATIONS

Karakostas, Bill, Dimitris Panagiotakis, and George Fakas. "Workflow requirements modelling using XML." Requirements Engineering 7.3. Sep. 2002, pp. 124-138. (Year: 2002).*
Choi, Y. et al. "Syntactic and semantic information extraction from NPP procedures utilizing natural language processing integrated with rules". Nuclear Engineering and Technology, vol. 53, Issue 3, 2021, pp. 866-878. https://doi.org/10.1016/j.net.2020.08.010.
Office Action issued in counterpart Korean Application No. 10-2021-0107849, dated Nov. 13, 2023 (34 pages).
International Search Report issued in corresponding International Application No. PCT/KR2021/015599 issued Feb. 16, 2022 (8 pages).
Written Opinion issued in corresponding International Application No. PCT/KR2021/015599 issued Feb. 16, 2022 (6 pages).

\* cited by examiner 6.1.4 REMOVE X Relay Trip Lever Window

FIG. 7A 6.1.5 IF CWS-335-1 (Bypass isolation valve) is OPEN,
THEN CLOSE CWS-V-335-1.

FIG. 9A 6.1.7 RECORD the following:
    Hardware Size: _____ inches

FIG. 14

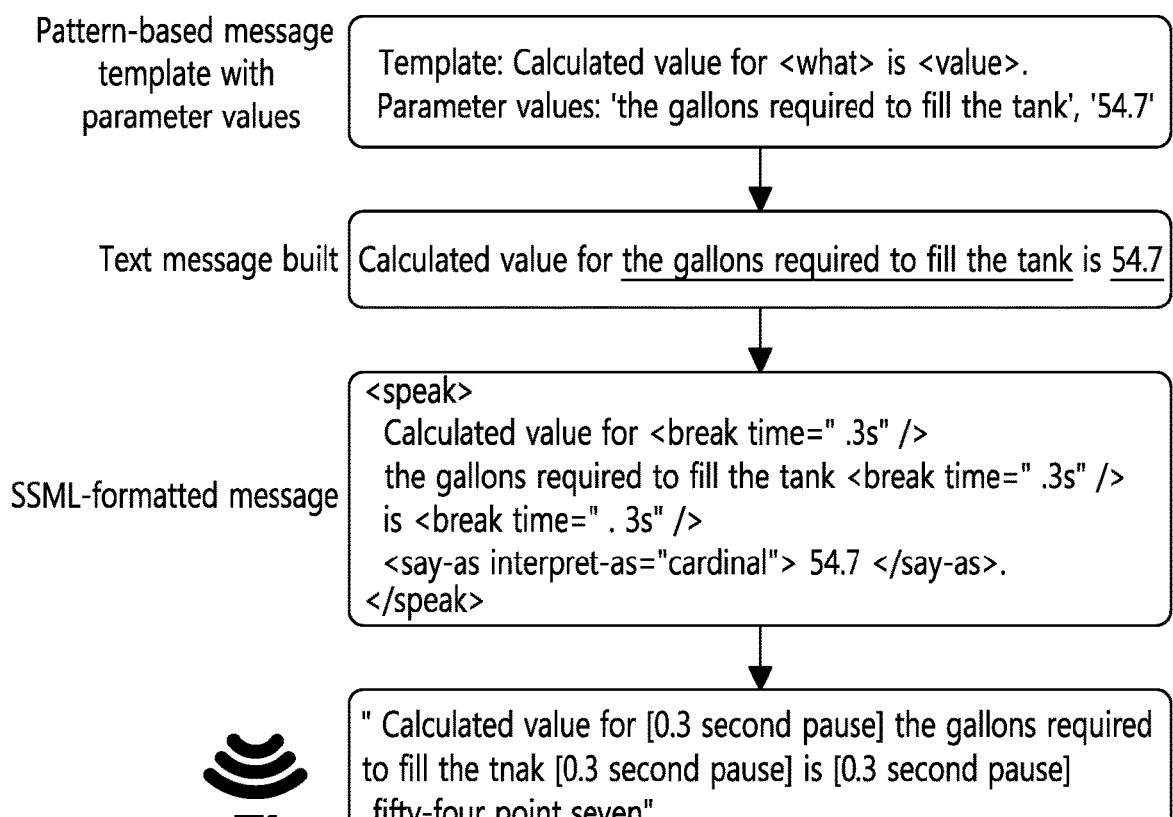

Pattern-based message template with parameter values

> Template: Calculated value for <what> is <value>.
> Parameter values: 'the gallons required to fill the tank', '54.7'

Text message built

> Calculated value for the gallons required to fill the tank is 54.7

SSML-formatted message

> <speak>
>   Calculated value for <break time=" .3s" />
>   the gallons required to fill the tank <break time=" .3s" />
>   is <break time=" . 3s" />
>   <say-as interpret-as="cardinal"> 54.7 </say-as>.
> </speak>

TTS

> " Calculated value for [0.3 second pause] the gallons required to fill the tnak [0.3 second pause] is [0.3 second pause] fifty-four point seven".

FIG. 17A

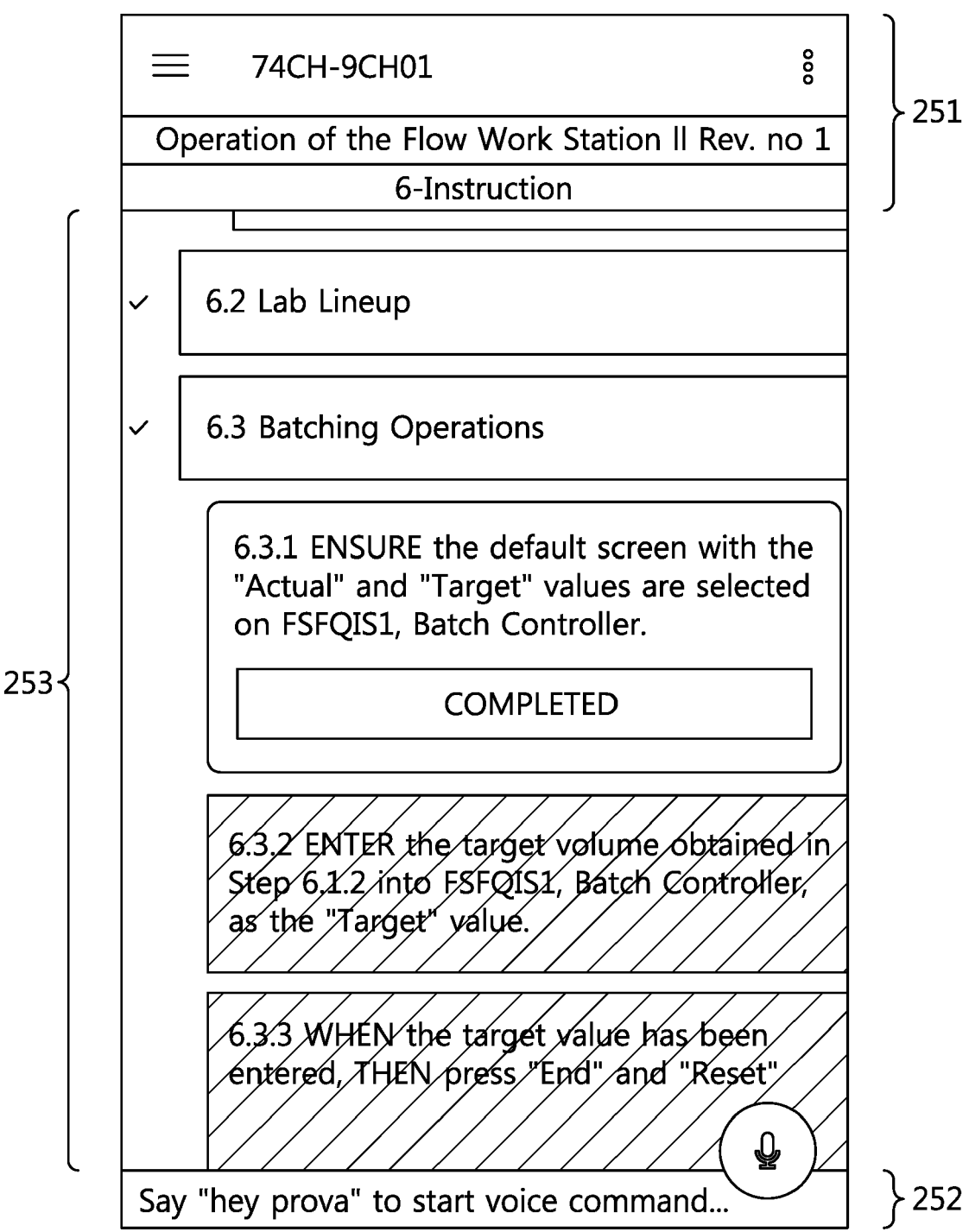

250

251

≡   74CH-9CH01   ⦂

Operation of the Flow Work Station II Rev. no 1

6-Instruction

253

✓   6.2 Lab Lineup

✓   6.3 Batching Operations 6.3.1 ENSURE the default screen with the "Actual" and "Target" values are selected on FSFQIS1, Batch Controller.

COMPLETED 6.3.2 ENTER the target volume obtained in Step 6.1.2 into FSFQIS1, Batch Controller, as the "Target" value.

6.3.3 WHEN the target value has been entered, THEN press "End" and "Reset"

Say "hey prova" to start voice command...

252

FIG. 18C 6.1.7 RECORD the following:

Hardware size: _____ inches
Lead size: _____

| ACKNOWLEDGE |

Figure 19B:
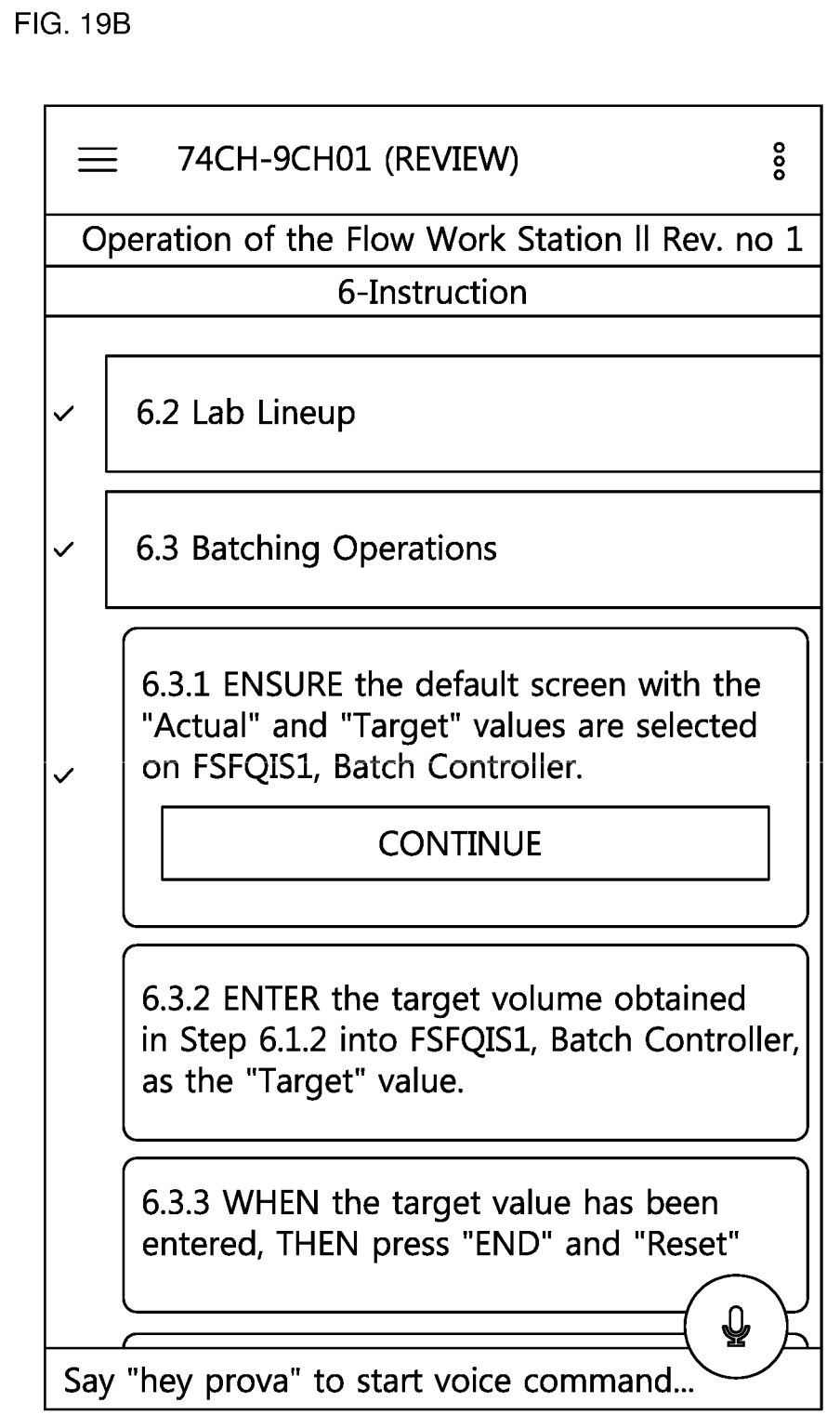

| ☰ | 74CH-9CH01 (REVIEW) | ⋮ |

Operation of the Flow Work Station II Rev. no 1

6-Instruction

✓ | 6.2 Lab Lineup

✓ | 6.3 Batching Operations

✓
6.3.1 ENSURE the default screen with the "Actual" and "Target" values are selected on FSFQIS1, Batch Controller.

CONTINUE 6.3.2 ENTER the target volume obtained in Step 6.1.2 into FSFQIS1, Batch Controller, as the "Target" value.

6.3.3 WHEN the target value has been entered, THEN press "END" and "Reset"

🎤

Say "hey prova" to start voice command...

METHOD AND SYSTEM FOR CONVERTING PLANT PROCEDURES TO VOICE INTERFACING SMART PROCEDURES

TECHNICAL FIELD

The present invention relates to a method and system for converting a plant procedure document into a smart procedure system capable of voice interfacing. Business Process Model and Notation (BPMN) process models of plant procedures, automatically built from procedure documents via natural language processing-based technology and expressed in eXtensible Markup Language (XML), are utilized as input to the smart procedure system.

BACKGROUND ART

A plant described in the present specification refers to an industrial plant operating large facilities, such as a power plant, an oil refinery, a (petro) chemical plant, a desalination plant, etc. The embodiments that are described below have been exemplified with nuclear power plant (NPP) procedures, however, it is apparent that the disclosure could be also applied to procedures of other types of industrial plants.

Procedures are essential for running a plant equipped with a lot of facilities, such as an NPP. They guide and support interactions with plant systems and responses to plant-related events.

Over the past several decades, plant work processes have been enhanced through inspections and checks to improve equipment utilization and plant safety. However, this had led to an increase in the complexity of operations, resulting in decreased productivity for workers and an escalation in the costs associated with plant operation and maintenance. More importantly, the problem of human error by plant personnel has also increased.

Recently, smart procedure systems running on mobile devices are increasingly being introduced at industrial plants as an effective platform for improving worker productivity and work quality. Compared to paper-based procedures, smart procedure systems have several advantages. However, plant workers need to hold, view and manipulate the mobile devices while working with plant equipment, which may act as another impediment to safety and productivity. In other words, it may interfere with the plant workers' original work of operating equipment that requires careful attention in the workplace. In addition, plant workers may find it difficult to hold and manipulate mobile devices due to other work tools or contaminants such as grease on their hands.

Therefore, an additional layer of functionality is required for the smart procedure system so that workers can focus on their work while receiving guidance related to the work procedures, away from manipulating mobile devices.

DISCLOSURE

Technical Problem

An object of the present disclosure is to provide a method and system converting a plant procedure document into a smart procedure system capable of voice interfacing, where BPMN process models of procedures are automatically built from procedure documents and expressed in eXtensible Markup Language (XML) to serve as input to the smart procedure system.

Another object of the present invention is to provide a method and system converting a plant procedure document into a smart procedure system capable of voice interfacing, where the smart procedure system operates without any access to external public communication networks and fundamentally protects the information infrastructure of a plant.

Another object of the present invention is to provide a method and system converting a plant procedure document into a smart procedure system capable of voice interfacing, where the smart procedure system can be easily extended and customized by utilizing a scenario-based operating mechanism.

Another object of the present invention is to provide a method and system converting a plant procedure document into a smart procedure system capable of voice interfacing, where the smart procedure system provides a customized support for each worker in a workgroup jointly performing the procedure by automatically switching exclusive execution control to the device of the worker assigned to perform the current procedure step.

Solution to Problem

A system according to an example of the present disclosure includes an extraction module configured to extract all significant syntactic and semantic information from a procedure; a generation module configured to build and store an extended Business Process Model and Notation (BPMN) process model of the procedure in eXtensible Markup Language (XML) utilizing the syntactic and semantic information extracted; and a conversion module configured to convert the procedure expressed in XML into a smart procedure system capable of voice interfacing.

The extraction module may include: a pre-processing unit comprising a non-text processing unit configured to separate out images and tables from the procedure and a text processing unit configured to extract structural properties and rich text features for each text paragraph of the procedure; an extended natural language processing (NLP) unit configured to apply existing NLP techniques by utilizing public NLP tools for each text paragraph returned from the pre-processing unit and to correct any misinterpreted NLP results; and an information extraction unit configured to extract all significant syntactic and semantic information for each text paragraph utilizing results of the pre-processing unit and the extended NLP unit. The significant syntactic and semantic information includes semantic elements, paragraph types, and step components.

The generation module may include a conversion unit that converts each text paragraph of a procedure into one or more individual BPMN elements and their property values, utilizing the syntactic and semantic information extracted; and a generation unit that generates a BPMN process model of a procedure by integrating and restructuring these individual BPMN elements.

The conversion module may be configured as a client-server architecture of a mobile application on a smart device and a server system for providing backend services.

The mobile application may include: a Voice User Interface (VUI) consisting of speech-to-text (STT) and text-to-speech (TTS) components; a Touch User Interface (TUI); and a controller that controls the entire operation of the mobile application including user interface functions.

The entire operation of the mobile application, including the interface between the user and the mobile application via voice or touch, may follow the predefined interaction scenario for each type of BPMN element in a process model of a procedure.

Proceeding to the next BPMN element, connected or attached by BPMN elements of a sequence flow or an association, may be processed in three different ways: a user-oriented way, a system-oriented way, and an automatic way. To let the user clearly recognize that it is proceeding to the next BPMN element, a specific notification sound is provided to the user at the end of each interaction scenario for those three ways.

The controller may control the overall operation of the mobile application, which includes recognizing user speech, detecting user intent, processing required transactions, and providing the processed results in synthesized speech.

The VUI may activate distinct speech reception modes of standby, command-detection, and data-entry, switching to a specific speech reception mode according to controls of the controller, convert captured user speech into a text, and forward the text to the controller by utilizing the STT components.

The controller may verify the text forwarded from the VUI is a valid command or data type. If confirmed, it processes designated transactions, otherwise it requests the user for a valid voice input again. The controller then reactivates the STT component of the VUI to a specific speech reception mode, depending on the operating status of the mobile application. No external services are utilized in this process.

The VUI may provide guidance to the user in synthesized speech utilizing the TTS component according to controls of the controller.

The controller may compose a text message for a voice output utilizing a pattern-based message template associated with each BPMN element type and property values of current instance of the BPMN element, extend the text message for a voice output using Speech Synthesis Markup Language (SSML) tags, and provide the text message to the user in synthesized speech via the TTS component of the VUI.

The mobile application client and the server system, of the conversion module, may be connected through a secure communication network of the plant.

The server system may include a Web API controller that receives and processes a request from a mobile application client and then returns the processed result to the requesting mobile application client; a WebSocket controller that broadcasts data to a group of designated mobile application clients, upon a request from the Web API controller; and a database that stores all data related to the operation of the conversion module.

Both the request from a mobile application client and the response of processed result from the server system may be interfaced through an application programming interface (API), which are provided at the server system and controlled by the Web API controller.

The server system may control the download of procedure XML files and automatically assign the role of each mobile application client participating in a workgroup, utilizing the work order data issued by a separate plant management system.

When multiple mobile application clients participate in a workgroup, the server system may grant execution control for any type of input exclusively to a single client of the user assigned to perform a current procedure step, receive an execution status including data input at a mobile application client granted with the execution control via the Web API controller and store the execution status in database, and broadcast the execution result to all other clients in the workgroup for synchronizing operation via the WebSocket controller.

Display screen of the TUI may include three area: a first area consisting of three rows each presenting the ID, the title and the section title respectively, of the procedure currently being performed; a second area consisting of a single line presenting valid or recognized user speech in text; and a third area between the first area and the second area presenting a scrollable vertical list of previously completed and subsequent procedure steps, ordered as in the procedure and centered on the procedure step currently being performed.

The procedure step currently being performed may be presented using a generic card layout template composed of four containers, each containing the step description, rows of optionally attached elements in case for an action step, clickable buttons, and a checkbox indicating the step execution status. According to the BPMN element type of the procedure step currently being performed, a specific card layout customized from the generic card layout template is used.

The label of an action button, which is one of clickable buttons, may change in the order of 'Acknowledge', 'Complete', and 'Next'. When clicked or corresponding user speech is recognized, with the TUI or the VUI respectively, different specific transactions may be processed according to its current label.

A conditional action step, of a kind of the action step, may include a card layout for conditional clause and a card layout for action clause. When the card layout for conditional clause is utilized and then a predetermined condition is satisfied, the card layout for action clause may be utilized.

The mobile application has additional features supporting preview of procedures, review of procedures with executed results, and easy configuration of mobile application operation such as speech speed of synthesized voice output and exclusion of a unit step in a specific voice interaction scenario. Re-instruction of current procedure step and returning to the previous procedure step are also supported each by a designated voice command.

The method of the present invention includes an information extraction stage that extracts all significant syntactic and semantic information from a procedure document; a generation stage that builds and stores an extended BPMN process model of a procedure in XML utilizing the syntactic and semantic information extracted, and a conversion stage that converts a procedure expressed in XML into a smart procedure system capable of voice interfacing.

The information-extraction stage may include a first step that preprocesses the procedure; a second step that applies existing NLP technologies to the text paragraphs returned from the first step and corrects any misinterpreted NLP results, of POS tags and parse trees of tokens; a third step that performs semantic element extraction, paragraph type classification, and action step component identification for each text paragraph of a procedure utilizing the results of the first and the second steps; and a fourth step that exports the extracted information into outputs of two or more forms including a database.

The generation stage may include a conversion step that converts each text paragraph of a procedure into one or more individual BPMN elements and property values of the individual BPMN elements, utilizing the syntactic and semantic information extracted; and a generation step that generates a BPMN process model of a procedure by integrating and restructuring these individual BPMN elements.

The conversion stage may be performed through the cooperation between the mobile application and the server system, connected via a secure communication network at the plant, according to a predefined interaction scenario for each BPMN element type in a process model of a procedure.

Each predefined scenario may include a speech recognition step that recognizes user speech; a user intent identification step that identifies user intent; a processing step that processes designated transactions according to the user intent identified; and a synthesized speech output step that produces the processed result in synthesized speech.

In the speech recognition step, user speech is first captured in an active speech reception mode and then converted into a text.

In the user intent identification step, the text converted from captured user speech is verified whether it is a valid command or data type.

The synthesized speech output step may include a composition step that builds a text message for a voice output using a pattern-based message template associated with each BPMN element type; an extension step that extends the output text message using a Speech Synthesis Markup Language (SSML) tags; and a provision step that provides the extended output text message in synthesized speech via the TTS component of the VUI.

According to another example of the present disclosure, a conversion method for supporting voice interfacing utilizing mobile applications and a server system includes: in order for multiple mobile application clients participating in a workgroup to jointly perform a single procedure in a harmonized manner, a switching step, by the server system, of automatically granting an execution control for any type of input exclusively to a single client of a worker assigned to perform a target step; and a synchronizing step, by the server system, of automatically synchronizing any execution result of a responsible client to all other clients in the workgroup.

Effects of Invention

According to the present invention, a plant procedure document could be converted into a smart procedure system capable of voice interfacing that operates in secure environment without using any external public services. Users can receive guidance regarding procedures and focus on their original works on plant equipment, being free from manipulating mobile devices. Users can also control the operation of the mobile application of the present invention and enter data, such as observed values, via voice. All operation results of the mobile application are stored to the server of the present invention, in real time via a secure communication network. Plant safety as well as human performance of both productivity and quality could be enhanced by reducing human errors.

According to the present invention, customized services could be provided for each worker participating in a workgroup jointly performing a procedure, via automatic transition of execution privilege and synchronization of the execution results among multiple mobile apps used by the workgroup members.

According to the present invention, the effort of converting numerous procedure documents into smart procedure systems capable of voice interfacing could be minimized since the BPMN models of procedures represented in XML are automatically built via the NLP-based technologies.

According to the present invention, an extended digital twin plant platform facilitating real-time bi-directional situational awareness of the work status of human workers. as well as the plant equipment status could be realized.

DESCRIPTION OF DRAWINGS

FIGS. 7A to 7C illustrate how a voice interaction for a conditional clause starting with 'IF ~' in a conditional action step is handled.

FIGS. 9A to 9C illustrates how a voice interaction for a record row, optionally attached to an action step to record data, is handled.

FIG. 14 illustrates an exemplary diagram of steps of template-based message composition and synthesized speech provision using a public Text-to-Speech (TTS) component.

FIG. 17A illustrates main TUI display layout of a mobile application.

FIGS. 19A to 19C illustrate additional features of TUI of a mobile application.

MODE FOR CARRYING OUT THE INVENTION

The advantages and features of the disclosure, and the manner of achieving them will be apparent from and elucidated with reference to the embodiments described hereinafter in conjunction with the attached drawings. Hereinafter, a detailed description of known functions and configurations incorporated herein will be omitted when it may make the subject matter of the disclosure unclear.

The following terms are defined in consideration of the functions of the disclosure, and these may be changed according to the intention of the user or operator.

The disclosure may, however, be embodied in many different forms and should not be construed as being limited to the embodiments set forth herein. Rather, these embodiments are provided so that this disclosure will be thorough and complete, and will fully convey the scope of the invention to those skilled in the art. The invention is only defined by the scope of the claims. Therefore, the definition should be based on the contents throughout this specification.

A detailed description of the disclosure will be given below with attached drawings. Before describing the present invention, voice interfacing methods will be described.

Figure 1:
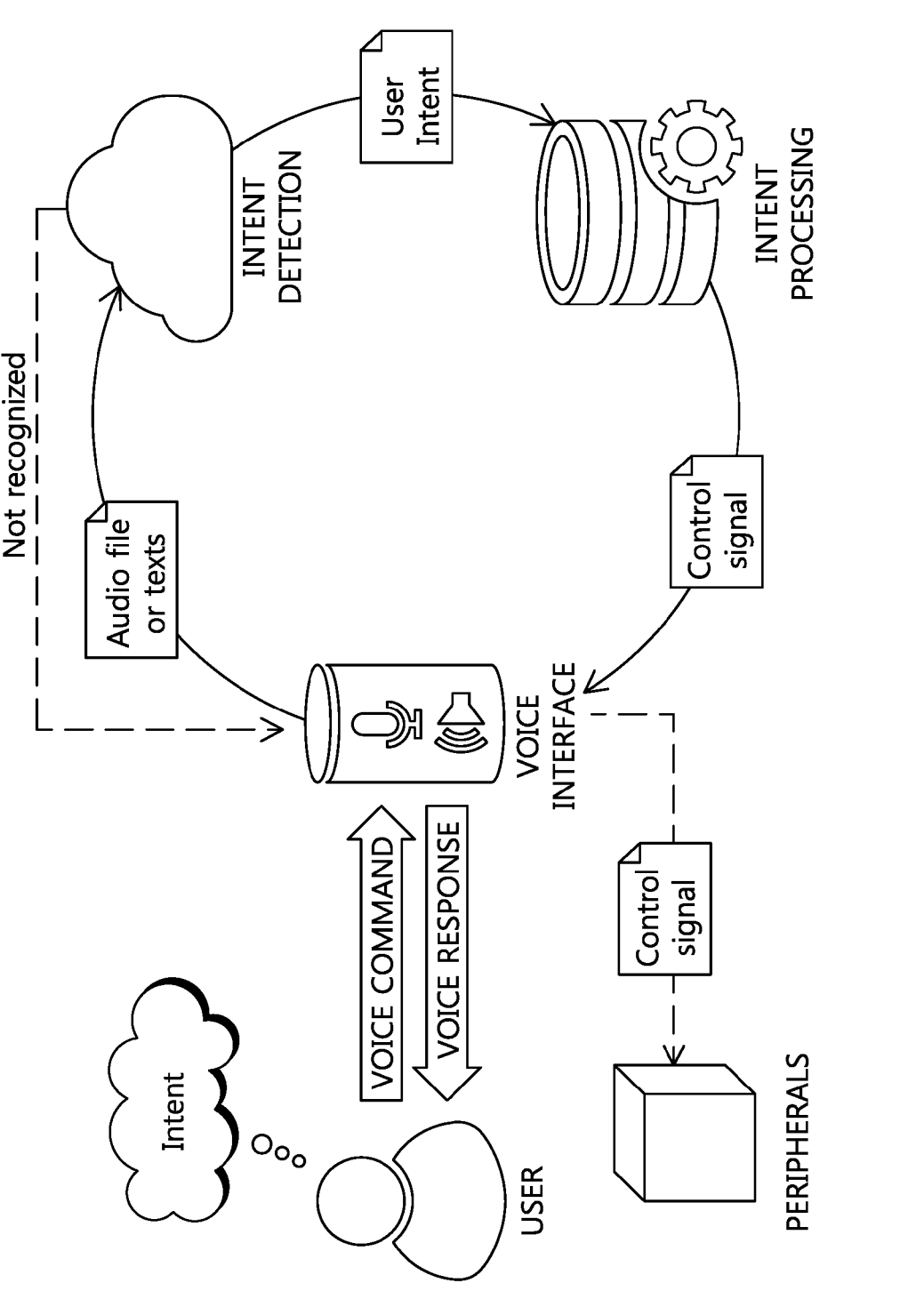
FIG. 1 illustrates the general architecture of a voice assistant system employing Voice User Interface (VUI).

FIG. 1 illustrates the general architecture of a voice assistant system employing voice user interface (VUI). As shown in FIG. 1, a voice assistant system is composed of a voice interface component that captures user speech input and produces the synthesized voice output; a backend server that identifies user intent from the captured voice input and then processes proper responses thereof, through a series of steps shown on a circle on the right; and possibly additional peripherals responsible for the system responses other than voice. When the VUI component captures user speech, the backend server detects user intent and then execute transactions required for proper responses. The resulting feedback is provided via synthetic speech output and activation of peripherals as needed.

Smart devices, such as smartphones or tablets, are in common use in various industries, but few VUI applications have been introduced in the industry sector. One of the reasons is the importance of maintaining information security, which is specially required in the plant industry. The architecture of state-of-the-art commercialized personal voice assistants is similar to that shown in FIG. 1. Connection to the public cloud server is required for their operation, especially for the detection and processing of user intent. Thus, security issues are raised with commercial voice assistants that often (1) collect device data and voice input of users, (2) store user data in the public cloud server, and (3) generally do not inform users regarding what kind of data the application is consuming. Moreover, some commercial personal assistants have voice activation vulnerabilities in that voice commands could be controlled and manipulated remotely.

To ensure plant safety and compliance with regulations, plant infrastructure needs to be secured from outside with multiple protection barriers. Therefore, the general voice assistant system platform of FIG. 1 having security vulnerabilities cannot be actively utilized in the plant industry, which is the main application of the present invention.

The VUI technology of the present invention does not utilize any external public cloud service at all. Thus, it is a very suitable architecture to support operations at a plant industry, which require access to procedural or technical information while performing a task, in secure environment.

However, there are other challenges in applying VUI technology to plant procedures. Manually converting hundreds or thousands of procedures into smart procedures that can be voice interfaced requires tremendous effort and time. It is not easy to manually represent all the important aspects of a procedure in an appropriate form. Integrity verification during manual conversion requires significant additional effort and time.

Therefore, there is a need for a way to automate or partially automate the conversion process that properly reflects all the important aspects of procedures into smart procedures while preserving years of operational experience and functional characteristics inherent in procedures.

The method of the present invention utilizes natural language processing (NLP)-based information extraction technology to convert numerous procedures into smart procedures capable of voice interfacing. All significant syntactic and semantic information contained in procedures are automatically extracted in a series of steps: a pre-processing step, an extended NLP step, and an information extraction step. Additionally, each procedure is automatically represented as a process model, leveraging the syntactic and semantic information extracted (semantic entities, paragraph types, and specific components for each action step). Embodiments of the present invention extend the Business Process Model and Notation (BPMN) standard and represent each procedure as an extended BPMN process model intuitively understandable by all stakeholders while preserving all significant details of the procedure.

Figure 2:
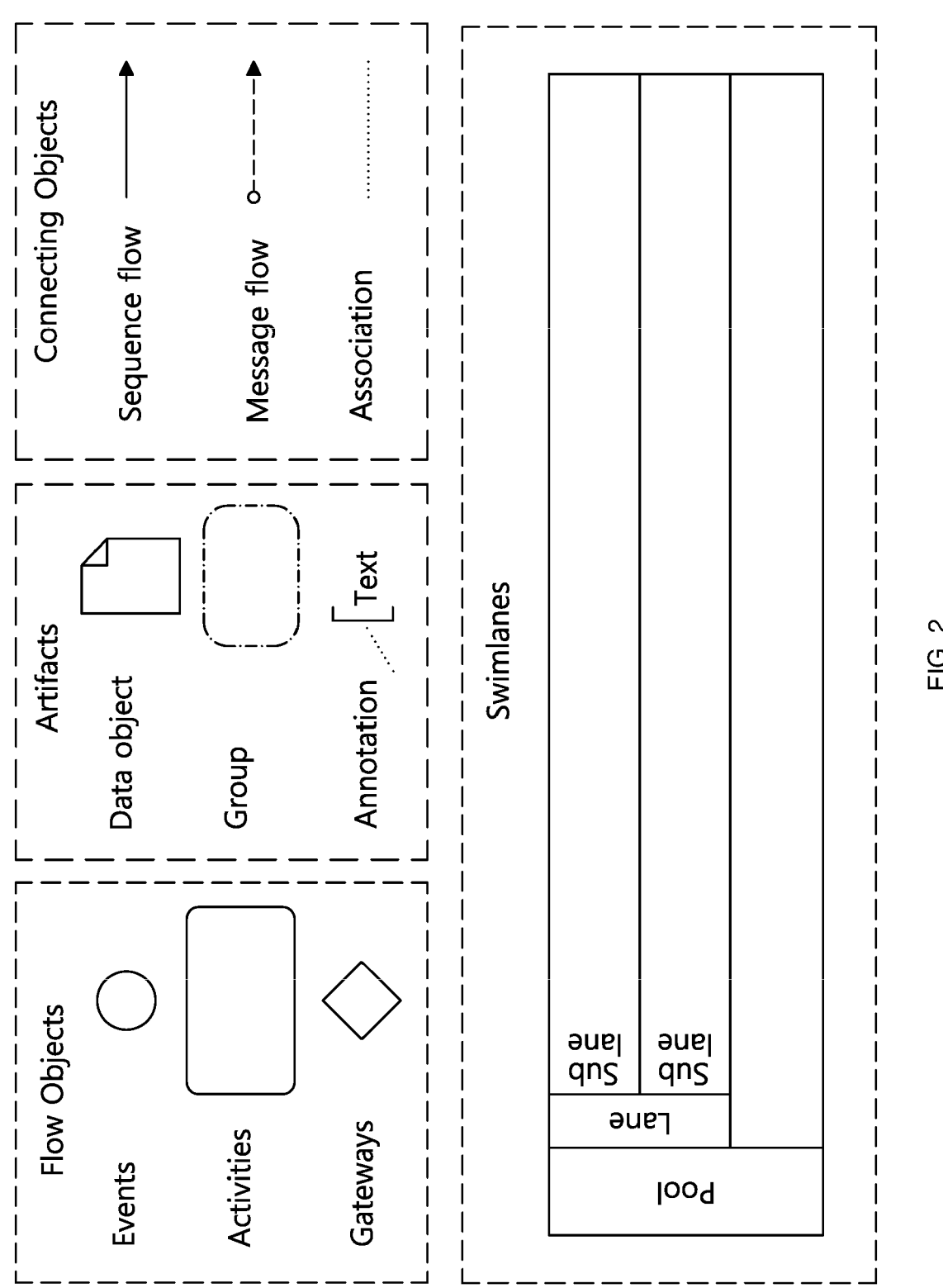
FIG. 2 illustrates the core BPMN elements.

FIG. 2 shows the core BPMN elements grouped into four categories: flow objects, artifacts, connecting objects, and swimlanes.

Flow objects include the elements of activity, event, and gateway that define the behavior of a process. Artifacts include the elements of data object, group, and annotation that do not affect the process flow. Connecting objects include the elements of sequence flow, message flow, and association that depict how the flow objects or data objects are connected to each other. A swimlane consists of a pool of one or more lanes containing connected BPMN elements of other categories.

Figure 3:
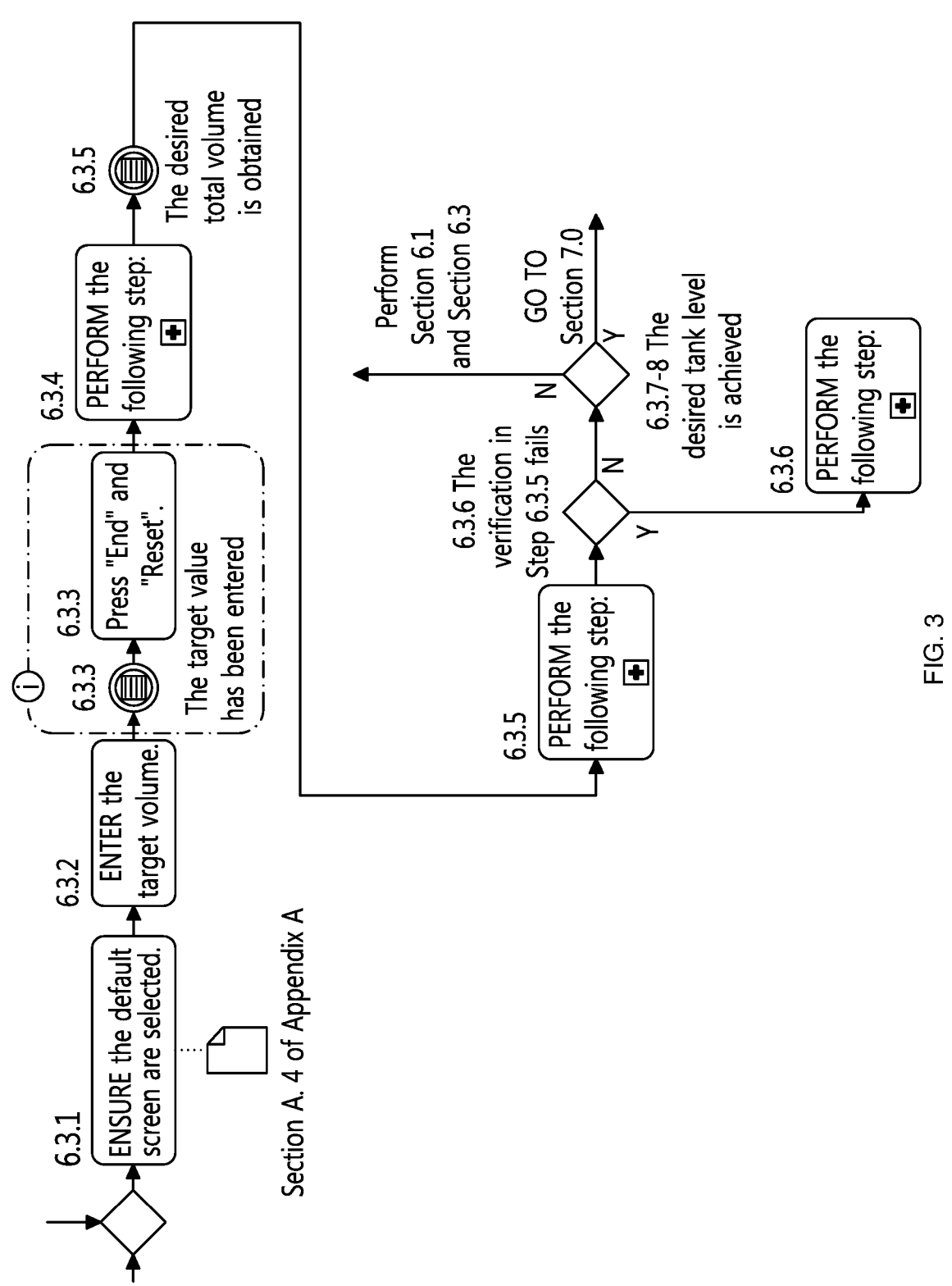
FIG. 3 illustrates a part of the extended BPMN diagram of the process model automatically built for a sample procedure.

FIG. 3 shows part of an extended BPMN diagram illustrating various BPMN elements of the process model built automatically from a sample procedure. Six rounded rectangles are activities, 3 for single tasks and the other 3 for sub-processes, each representing an action step in the procedure. A subprocess activity is discriminated by an additional small rectangle with a cross at the bottom. Three diamonds are gateways for splitting or merging sequence flows. Two double-bordered circles are extended events, each representing a conditional component starting with 'WHEN~'. A rounded dashed rectangle represents a group of elements, where a small circle marked inside with an 'i' on the upper left border represents note description(s) associated with that group of elements. Lastly, a rectangle folded with the upper right corner is an artifact representing a referenced section.

An XML file of the BPMN process model for each procedure is then generated and used as input to the conversion module.

Figure 4:
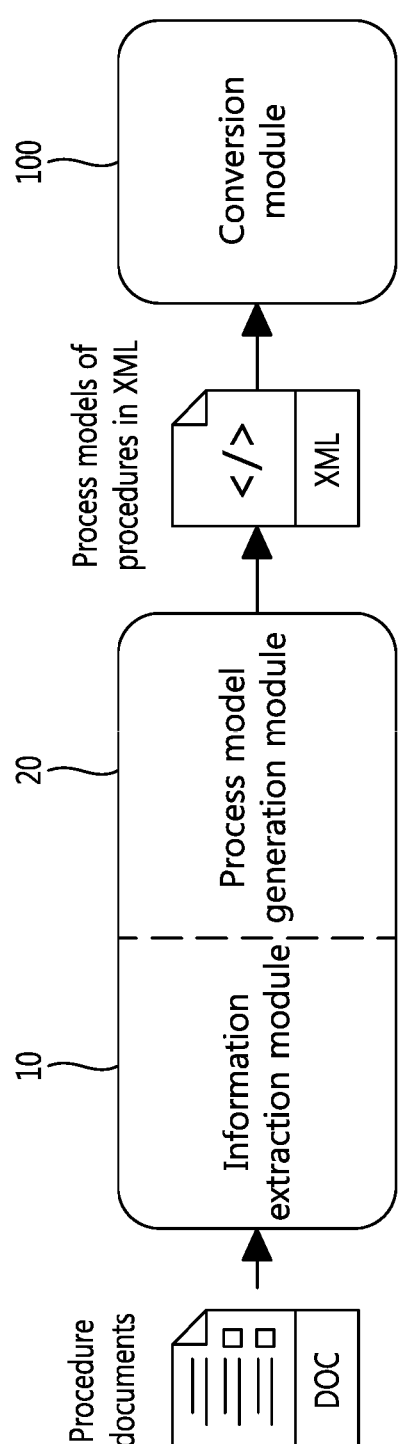
FIG. 4 illustrates a block diagram of the system, according to one or more embodiments of the present disclosure, that converts plant procedure documents into smart procedure systems capable of voice interfacing.

The system configuration of the present invention will be described. FIG. 4 shows a block diagram of a system for converting plant procedures into smart procedures capable of voice interfacing, in accordance with the embodiments of the present invention.

Referring to FIG. 4, the system of the present invention includes an (information) extraction module 10 that extracts all significant syntactic and semantic information from each phrase (sentence) in procedure documents; A (process model) generation module 20 that constructs an extended BPMN process model for each procedure using the syntactic and semantic information extracted by the (information) extraction module 10 and stores it in XML; and a conversion module 100 that converts the input XML process model of a procedure into a smart procedure system capable of voice interfacing.

The (information) extraction module 10 may include the following units: a preprocessing unit comprising a non-text processing subunit that separates out images and tables in input procedure documents and a text processing subunit that extracts structural properties and rich text features for each text paragraph of input procedure documents; an extended natural language processing (NLP) unit that applies existing NLP technologies utilizing public NLP tools for each text paragraph returned from the preprocessing unit and corrects any misinterpreted NLP results; and an information extraction unit that extracts all significant syntactic and semantic information including semantic elements, paragraph types, and step components for each action step paragraph utilizing the results of preprocessing and extended NLP units.

The preprocessing unit may include a non-text processing subunit (Non-Text object handling) and a text processing subunit (Create and fill-in text feature for 'Paragraph' instances).

The extended NLP unit is a customized NLP tool that applies a public NLP tool first to text paragraphs received from the preprocessing unit, including those documented in tables, and then corrects any misinterpreted NLP results. The extended NLP unit may include the following three subunits: a first NLP unit for tokenization, sentence splitting, and lemmatization; a second NLP unit for part-of-speech (POS) tagging for each token and hierarchical structuring of tokens for each sentence; and a third NLP unit that detects and corrects any misinterpreted NLP results from the output of the second NLP unit, utilizing pattern-based built-in rules integrated with a lexical database.

The information extraction unit may include the following three subunits: a semantic element extraction (SE) unit that identifies any significant word(s) of token(s) each to be tagged with one of predefined semantic types utilizing ontology lookup and pattern-based built-in rules; a paragraph type classification (PC) unit that identifies each paragraph as one of predefined paragraph types; and a step component identification (CI) unit that detects multiple optional components for each paragraph of the action step type.

The (process model) generation module 20 converts each text paragraph into one or more individual BPMN elements and their property values, utilizing the syntactic and semantic information extracted. These individual BPMN elements are connected or attached to each other according their paragraph types and precedence relations. This integrated model is restructured to make the final BPMN process model of a procedure to be concise and easy to understand for all stakeholders, as illustrated in FIG. 3. Details of each procedure step stored as the property values of the corresponding BPMN element are not shown in FIG. 3.

Figure 5:
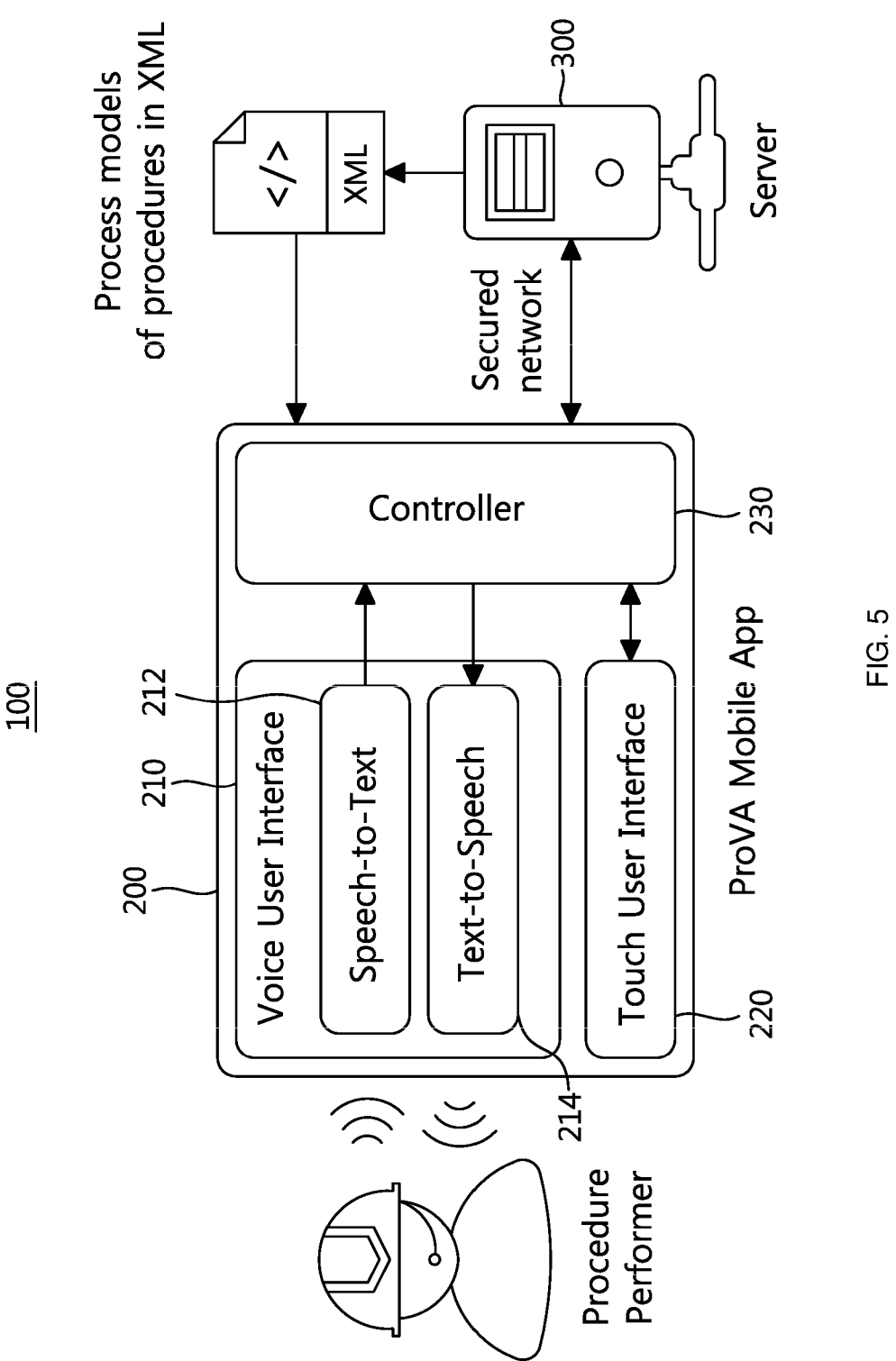
FIG. 5 illustrates a block diagram of the conversion module in FIG. 4 illustrating the collaboration between a mobile application client and a server system, provided with the details of the mobile application.

FIG. 5 is a diagram showing the configuration of the conversion module 100 of FIG. 4, in accordance with the embodiments of the present invention. The conversion module 100 is a client-server architecture composed of a mobile application 200 on a smart device and a server system 300 providing backend services. Hereinafter, the conversion module 100 is treated as a cooperative system of the mobile application 200 and the server system 300. The smart device could be any device capable of cooperating with the server system 300 by loading the mobile application 200. A headset may be used for voice interface via Bluetooth wireless communication, etc.

The mobile application 200 of these embodiments was developed in the 'Google Android' environment using 'Android Studio', but may also be developed in other platforms compatible with other operating systems of 'Apple iOS'. The mobile application 200 may include a voice user interface (VUI) 210, a touch user interface (TUI) 220, and a controller 230 that controls an interface with a user.

The voice user interface 210 may include a Speech-to-Text (STT) component 212 and a Text-to-Speech (TTS) component 214, publicly developed to operate on a smart device.

The controller 230 is in charge of all operations of the mobile application 200, such as recognizing user speech, processing required transactions according to the interpreted user intent, and providing feedback in synthesized speech. The controller 230 also manages interactions with users and communication with the server system 300 over a secure network such as private LTE.

The server system 300 providing backend services for the mobile application 200 processes the request of the mobile application 200 and returns the result to the requesting mobile application 200. It mainly handles storage, retrieval, and delivery of data, necessary or acquired related to the operation of the mobile application 200. It also performs other system management functions, such as management of user accounts, and stores and distributes the latest versions of the mobile application 200 and the XML process models of procedures.

In the present invention, interactions between the user and the mobile application 200, via the VUI or the TUI, follows a predefined interaction scenario for each type of BPMN element in the XML procedure. These interaction scenarios can be decomposed into three parts: (1) processing an activity of an action step; (2) evaluating a split gateway or an event for the condition component optional to an action step; (3) processing optionally attached element(s) to an action step. Other BPMN elements, such as an artifact associated with an activity, are processed in simple variations of these three scenarios. A simple additional type of scenario is for (4) proceeding to the next BPMN element, attached or connected by BPMN elements of a sequence flow or an association.

Each part of these interaction scenarios is processed through the cooperation of the mobile application 200 and the server system 300 in a secure environment, without any access to external cloud servers. This processing mechanism is essential for the conversion module in converting XML process models of procedures into voice interfacing smart procedures.

Figures 6A, 6B:
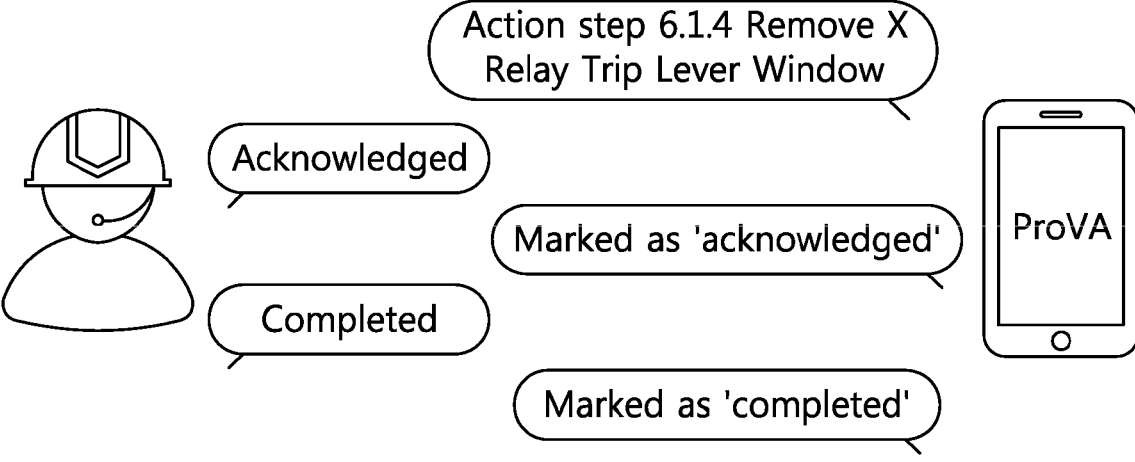
FIGS. 6A to 6C illustrate how a voice interaction for a simple action step is handled.

FIG. 6 is an example of a voice interaction scenario for a paragraph of simple action step, shown in FIG. 6A, that has no conditional clause. It is represented as a series of five speech bubbles (three from the mobile application and two from the user) as shown in FIG. 6B. Each of these speech bubble is treated as a basic VUI unit.

Figure 6C:
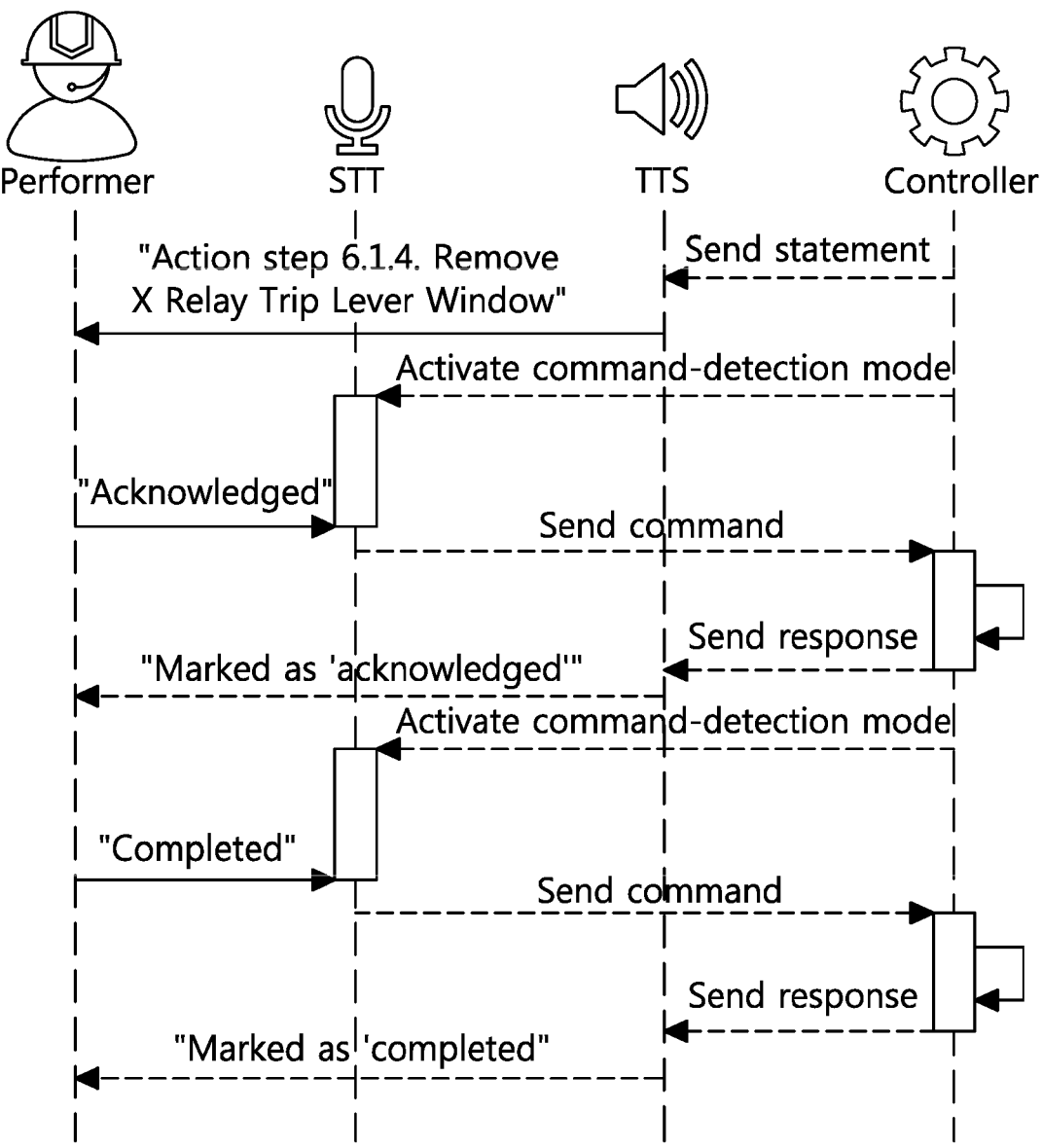

FIG. 6C is a sequence diagram for processing the voice interactions between the user and the mobile application 200 according to the scenario of FIG. 6B. In FIG. 6C, a solid arrow represents a voice guidance (including a question) from the mobile application 200 or a user speech, and a dashed arrow represents a message between mobile application components or a notification to the user. It is shown that that basic VUIs of speech bubbles in FIG. 6B are sequentially processed between the user and the mobile application 200, each via a set of arrows. By utilizing such a simple and intuitive scenario-based control mechanism, the mobile application 200 can be easily extended and customized by updating the processing scenario for each type of BPMN element (i.e., the sequence diagram itself) or the implementation of each basic VUI unit (i.e., corresponding set of arrows in the sequence diagram). Interfacing with the server system 300 by the controller component 130 is indicated by a back arrow, which will be described later.

FIG. 7 illustrates how the voice interaction for the conditional clause starting with 'IF ~', optional to an action step, is handled.

It will be explained with an exemplary conditional action step shown in FIG. 7A. The keyword 'IF' in a conditional action step is associated with a condition whose result can either be true or false. Thus, the conditional clause starting with 'IF' is represented as a split gateway preceding the activity corresponding to the action clause after 'THEN', in the BPMN process model of a procedure.

Figure 7A:
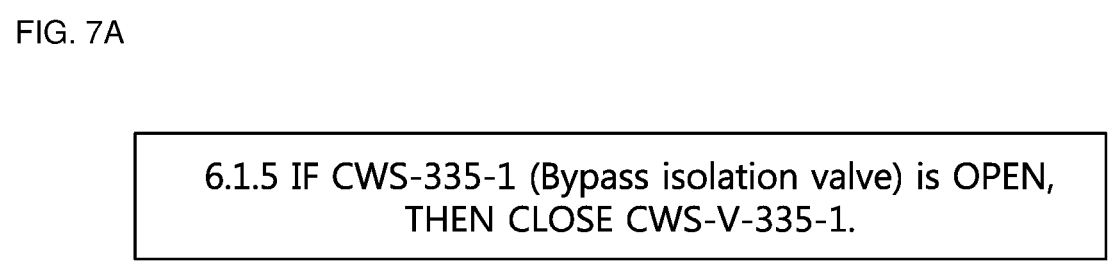
Figure 7B:
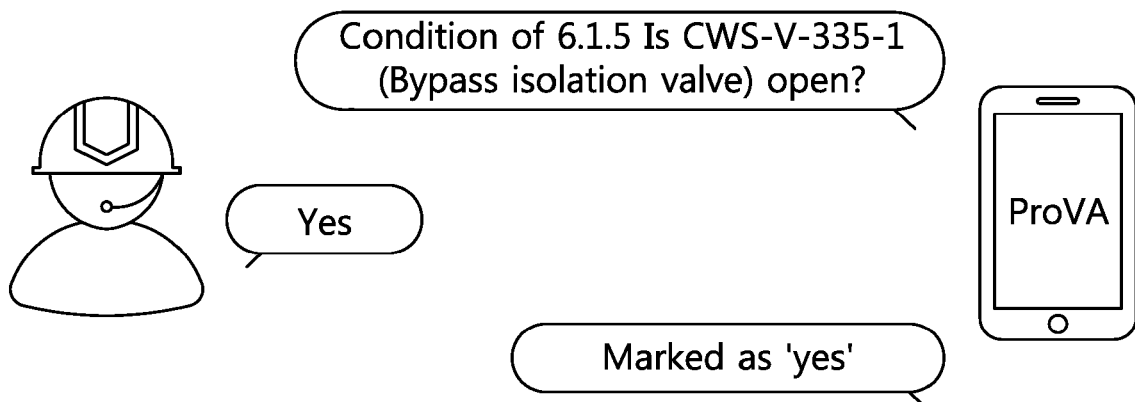
Figure 7C:
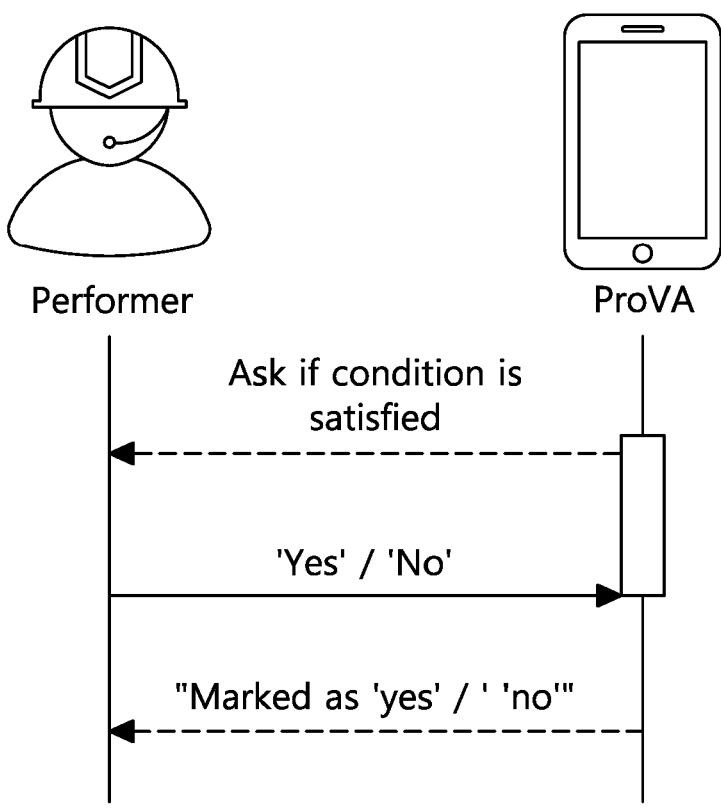

The split gateway corresponding to the conditional clause in FIG. 7A can be processed with a scenario of a total three basic VUIs, two from the mobile application 200 and one from the user, as shown in FIG. 7B. FIG. 7C is a simplified sequence diagram for processing the voice interactions between the user and the mobile application 200 according to the scenario of FIG. 7B. The task activity corresponding to the action clause of the conditional action step of FIG. 7A, i.e., the clause following 'THEN' in the bottom row, can be handled similarly to FIG. 6.

Figure 8A:
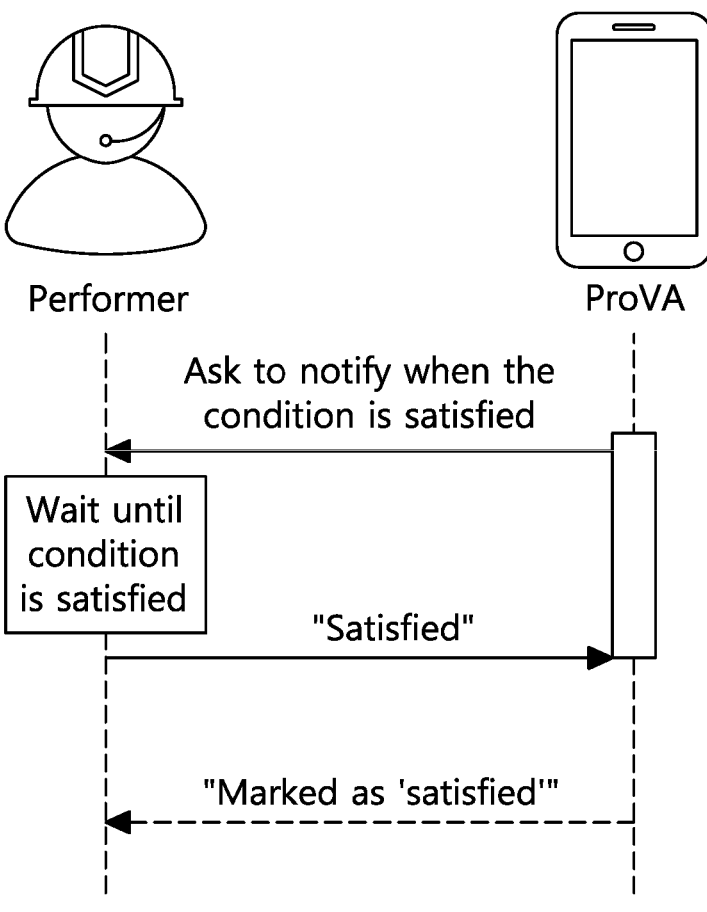
FIG. 8A illustrates a sequence diagram processing a voice interaction for a conditional clause starting with 'WHEN ~' in a conditional action step.

FIG. 8A illustrates a sequence diagram processing the voice interaction for the conditional clause starting with 'WHEN ~' in a conditional action step.

Figure 8B:
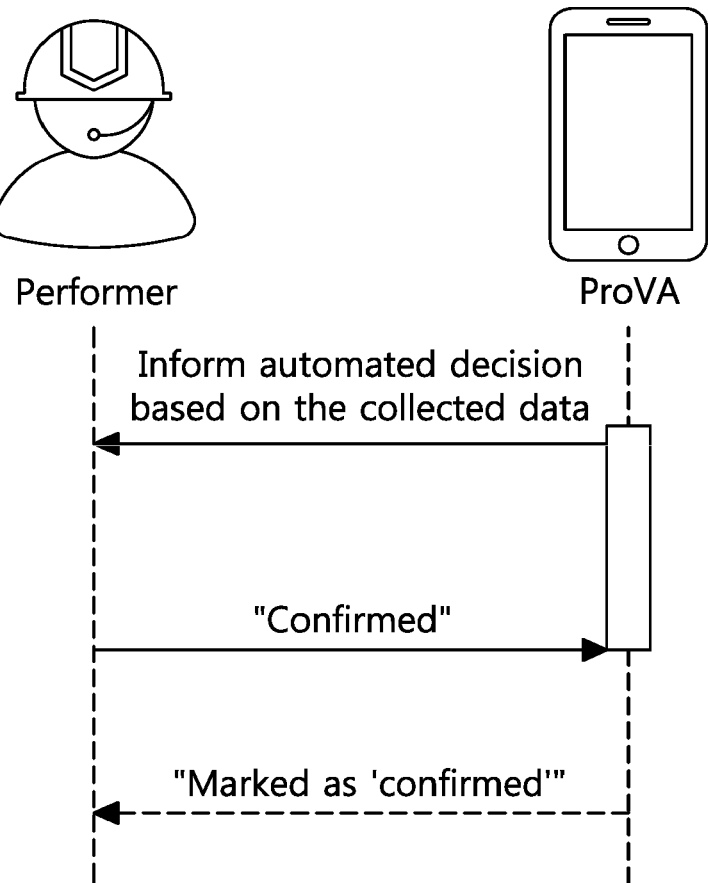
FIG. 8B illustrates a sequence diagram processing a voice interaction in case any type of conditional clause in a conditional action step is evaluated automatically utilizing data acquired before.

The keyword 'WHEN' is associated with a condition that is expected to occur. Thus, the conditional clause starting with 'WHEN' is represented as an event that is required to occur, in the BPMN process model of a procedure, immediately before the activity corresponding to the action clause. As shown in FIG. 8A, this scenario is handled in a manner slightly different from FIG. 7C. Some conditional clauses, whether they start with 'IF~' or 'WHEN', can be automatically evaluated using data collected by the mobile application, during the current running instance of the procedure. The sequence diagram in FIG. 8B illustrates how to handle such a case.

Figure 9A:
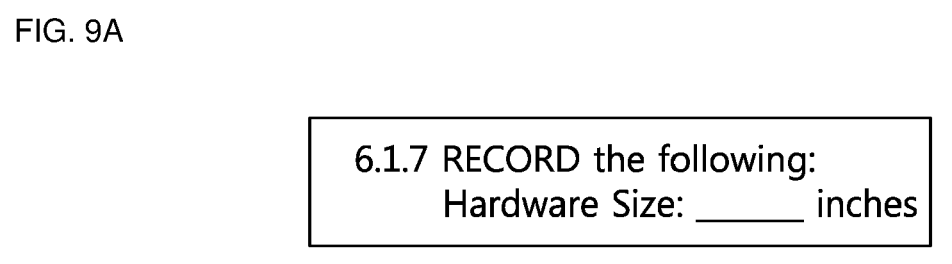
Figure 9B:
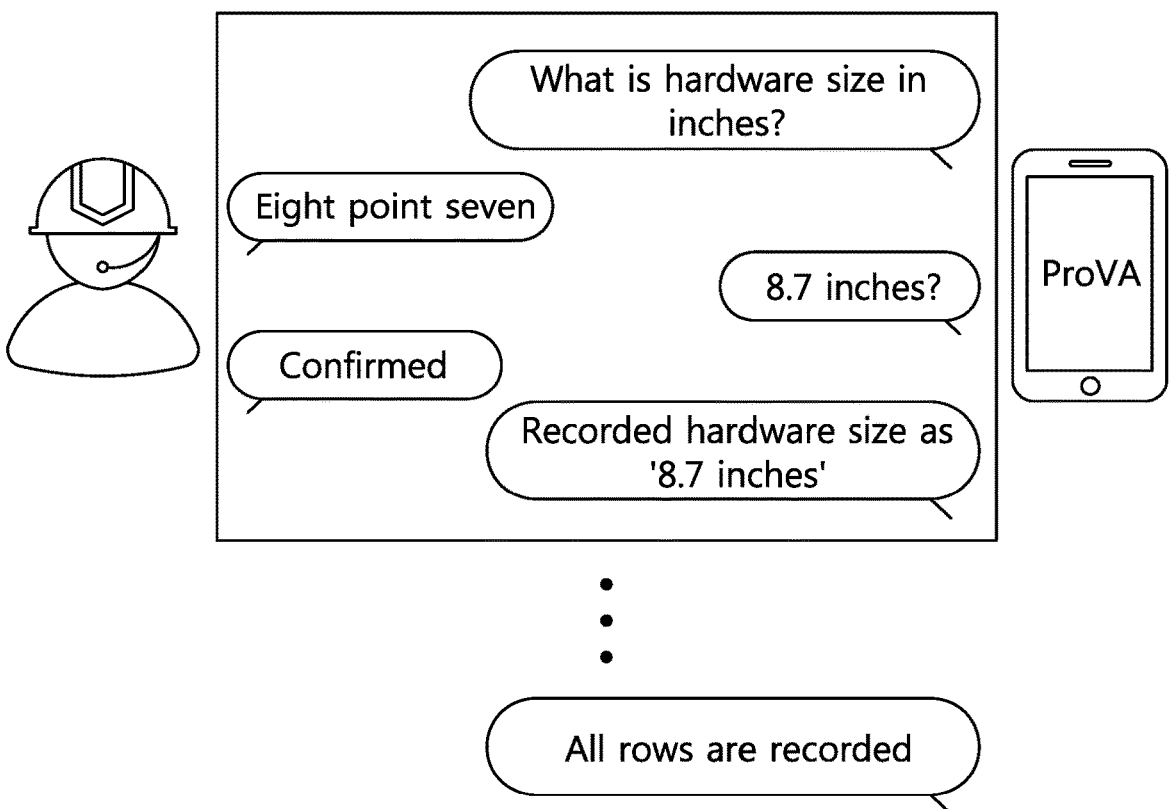
Figure 9C:
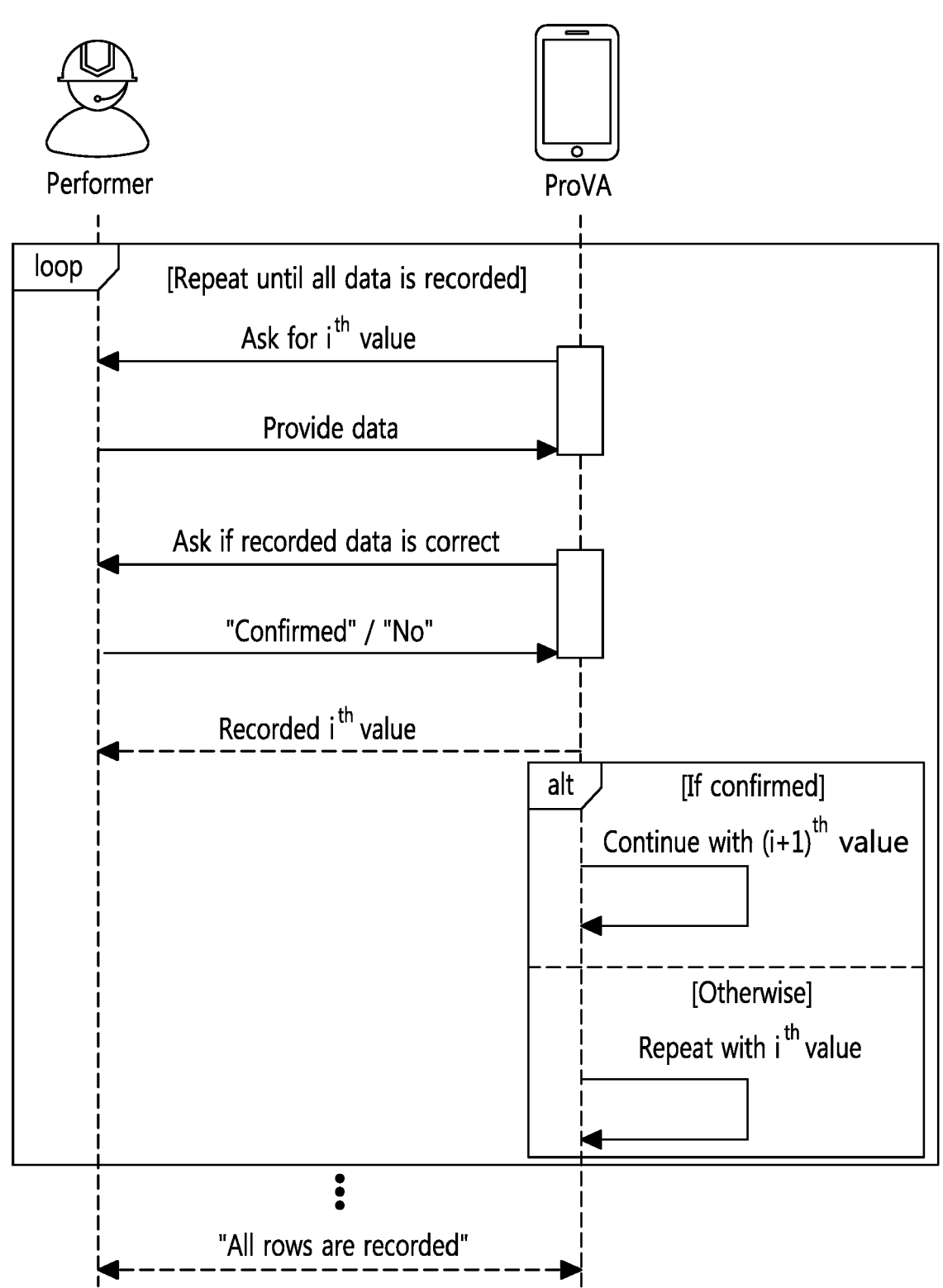

FIG. 9 illustrates how the voice interaction for a record row optionally attached to an action step is handled, with an example shown in the second row of FIG. 9A. This record row of 'Hardware Size: inches' can be processed with a scenario of a total of five basic VUIs, three from the mobile application 200 and two from the user, as shown in FIG. 9B. An additional sixth speech bubble is optionally used when more than one record row is attached. FIG. 9C is a sequence diagram for processing the voice interactions between the user and the mobile application 200 according to the scenario of FIG. 9B.

When multiple record rows are attached to an action step, the group of five basic VUI units for a record row, represented inside a rectangle in FIG. 9B, are invoked the same number of times. In the sequence diagram of FIG. 9C, the group of these five interactions is represented inside the outer rectangle with the tag of 'loop' at the upper left corner.

The interactions shown inside the inner rectangle with the tag of 'alt' at the upper left corner indicate that the interactions inside the outer rectangle will be repeated if the data provided by the user is not correctly recognized by the mobile application 200.

Other BPMN elements are handled with simple variations of the scenarios described above.

For example, a procedure step requiring no physical action other than user's acknowledgement, such as a (sub) section title or a note, could be handled with a simplified version of FIG. 6B with the last two basic VUI units omitted. A BPMN element associated with a group of activities is handled prior to that group of activities.

Proceeding to the next BPMN element, attached or connected by BPMN elements of a sequence flow or an association, is handled as follows.

Proceeding to the next BPMN element, attached or connected by BPMN elements of a sequence flow or an association, can be processed in three different ways: a user-oriented way, a system-oriented way, and an automatic way.

Figure 10A:
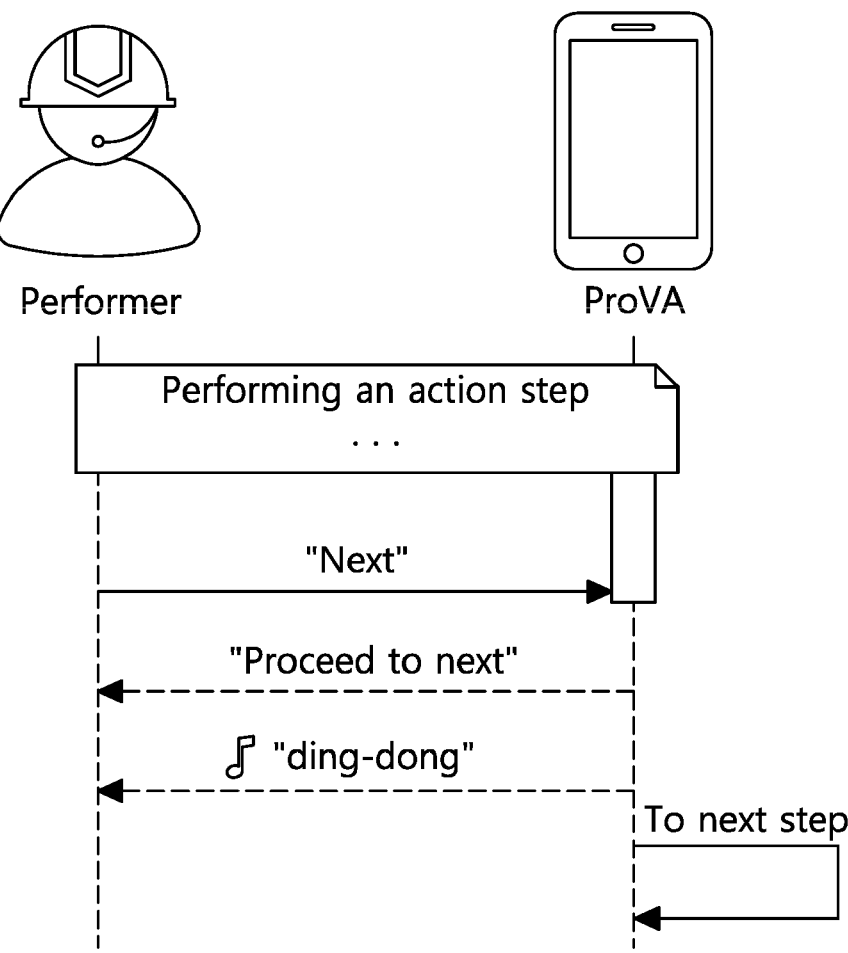
FIGS. 10A to 10C respectively illustrate sequence diagrams showing three different ways of voice interactions for proceeding to the next BPMN element.
Figure 10B:
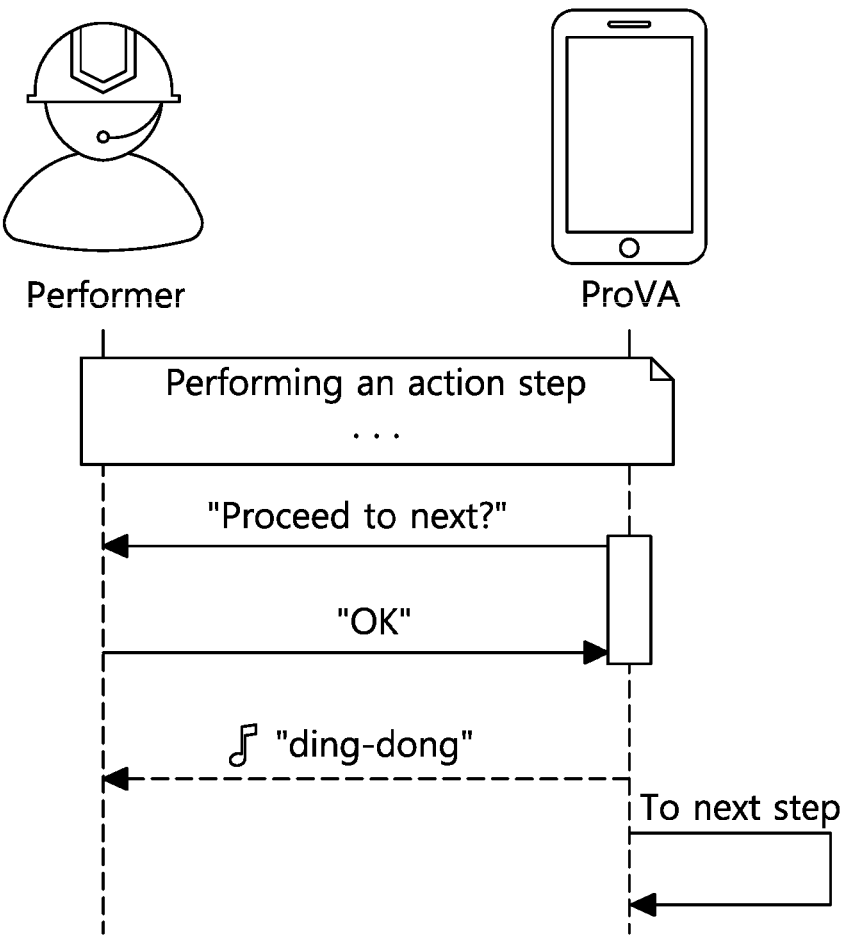
Figure 10C:
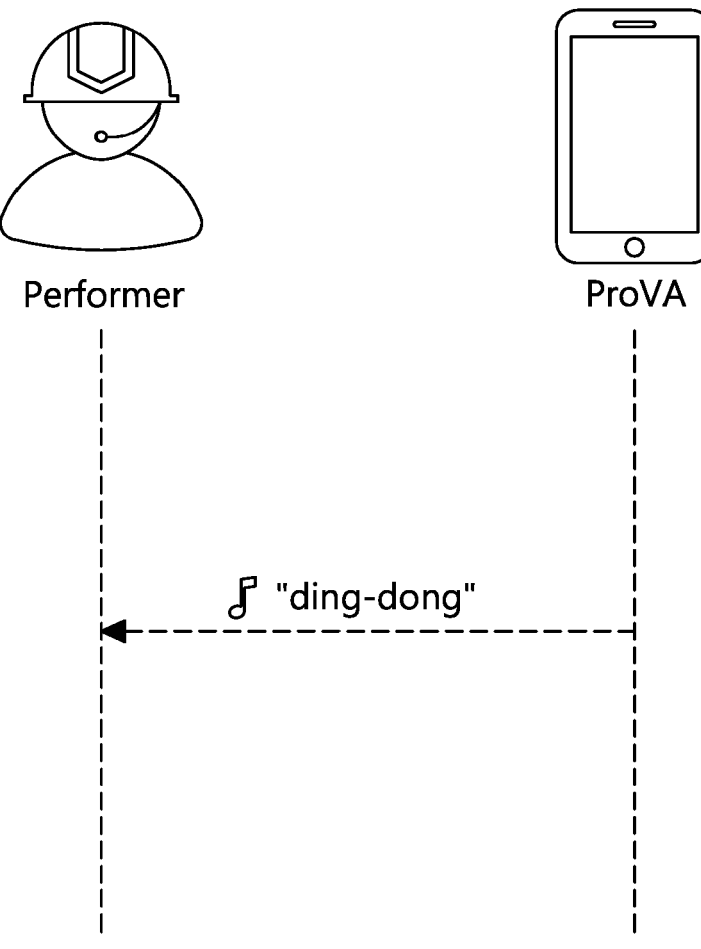

FIG. 10 illustrates the above three ways. A simple notification sound such as 'ding-dong' is included at the end of voice interfacing stepin all cases to let the user clearly recognize that it is proceeding to the next BPMN element. Except for FIG. 10C, confirmations from the mobile application 200 or the user is also included, respectively in FIG. 10A and FIG. 10B.

In addition, the system of the present invention supports to guide the current BPMN element again or return to the previous BPMN element at any time with a voice command. This strengthened control authority allows users to accurately perceive the contents of procedures and improve the quality of their works.

Next, speech recognition using the STT component 212, in accordance with the embodiments of the present invention, will be described. First, the mobile application 200 of the present invention support three types of speech reception modes utilizing one or more public components as the STT component 212.

Figure 11:
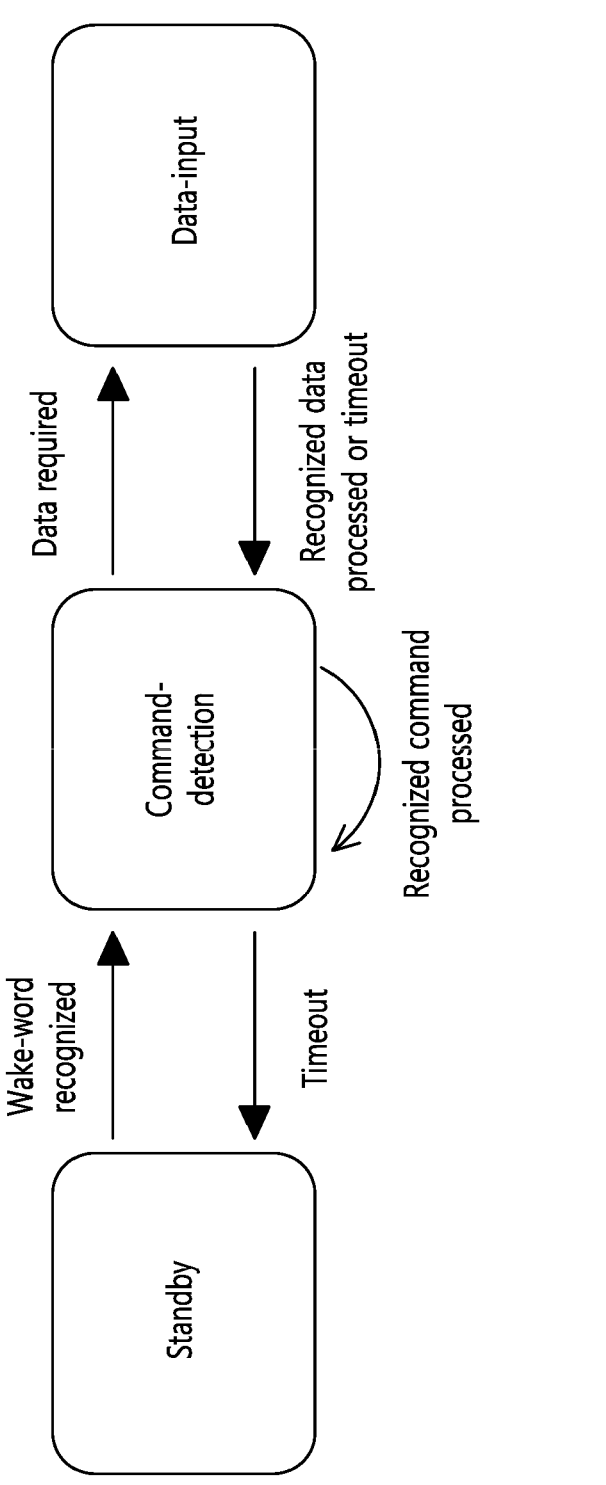
FIG. 11 illustrates transition conditions among three types of speech reception modes.

As illustrated in FIG. 11, the mobile application 200 captures user speech in three different modes: standby, command-detection, and data-entry. The types of valid voice input are predefined for each speech reception mode. Activation and switching to a specific speech reception mode is all invoked by the controller 230 on each specific condition as follows:

In standby mode, it switches to command-detection mode only when the predefined wake-up word is captured, ignoring all others.

In command-detection mode, it is handled as follows: In case a valid voice command is captured, the controller 230 invokes corresponding transactions to be processed and then reverts to the same mode; In case data entry is required, the controller 230 switches to data-entry mode; In case no voice input is captured for a certain period of time, the controller 230 switches to standby mode.

In data-entry mode, it is handled as follows: In case numerals or alphanumeric data is captured, the controller 230 invokes corresponding transactions to process it as an input data and then switches to command-detection mode; In case no voice input is captured for a certain period of time, the controller 230 switches to command-detection mode.

Figure 12:
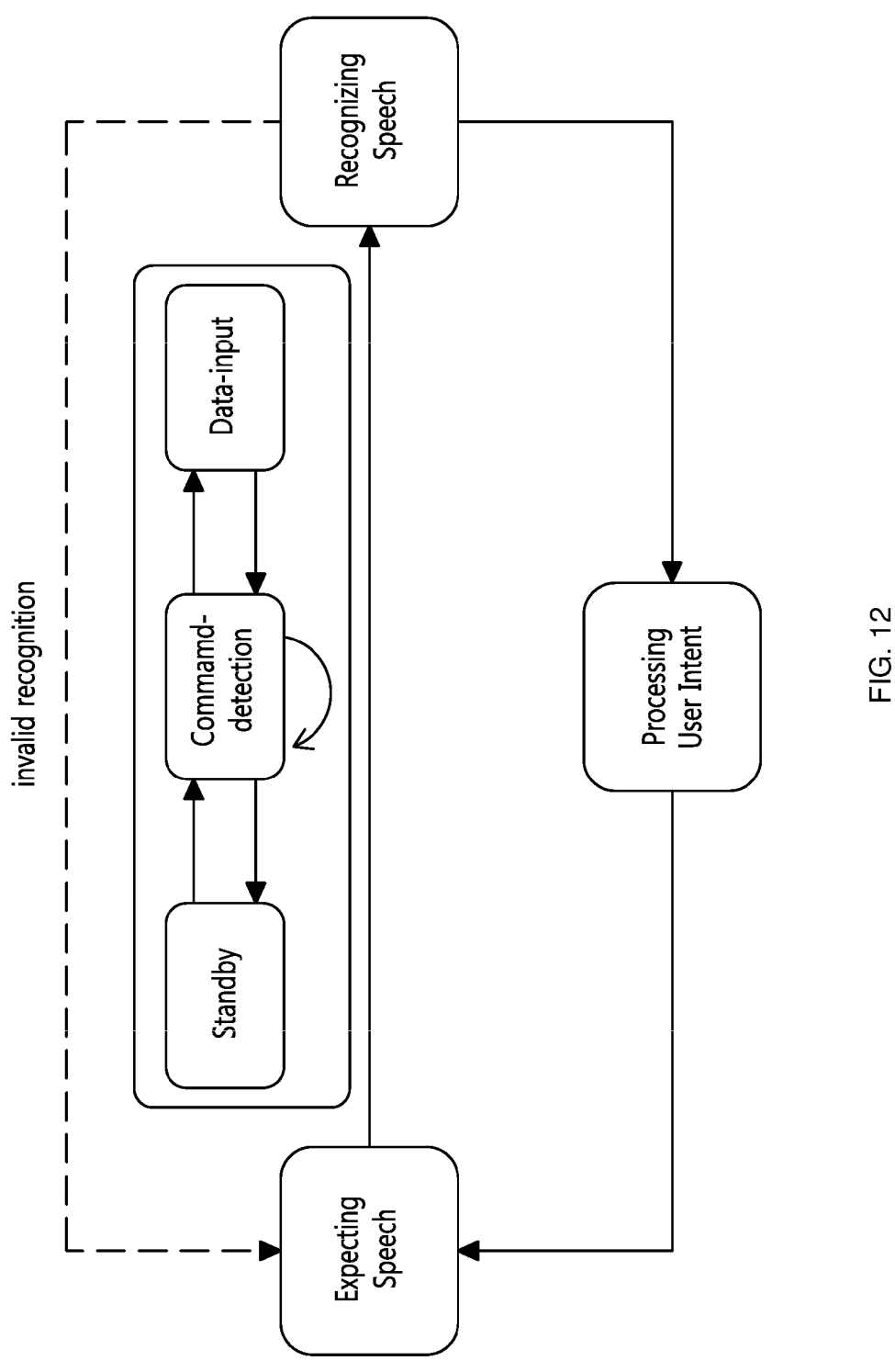
FIG. 12 illustrates a block diagram of the state transition mechanism of a mobile application 200 when operated via Voice User Interface (VUI).

FIG. 12 is a block diagram illustrating the state transition mechanism of the mobile application 200 when operated via the VUI 210.

As shown, the mobile application 200 captures and then processes user speech through successive transitions between three states: 'Expecting speech', 'Recognizing speech', and 'Processing user intent'. This state transition is closely related to the aforementioned processing method for each speech reception mode.

More specific steps for capturing and processing user speech by the mobile application 200 are as follows. The controller 230 activates the STT component 212 in one of the three speech reception modes to capture user speech. When user speech is captured, the STT component 212 converts it into a text to be forwarded to the controller 230. The controller 230 verifies whether the forwarded text is valid as a command or as a data type. If validated, it is finally recognized as the user intent. Recognized user intent is processed through a set of designated transactions, and corresponding feedback is provided to the user in synthesized speech. The controller 230 then activates the STT component 212 back into the appropriate speech reception mode to capture next user speech. During the entire aforementioned process, no external services are accessed to ensure information security.

In case an invalid user speech is captured, the controller 230 reactivates the STT component 212 to capture next user speech.

Figure 13:
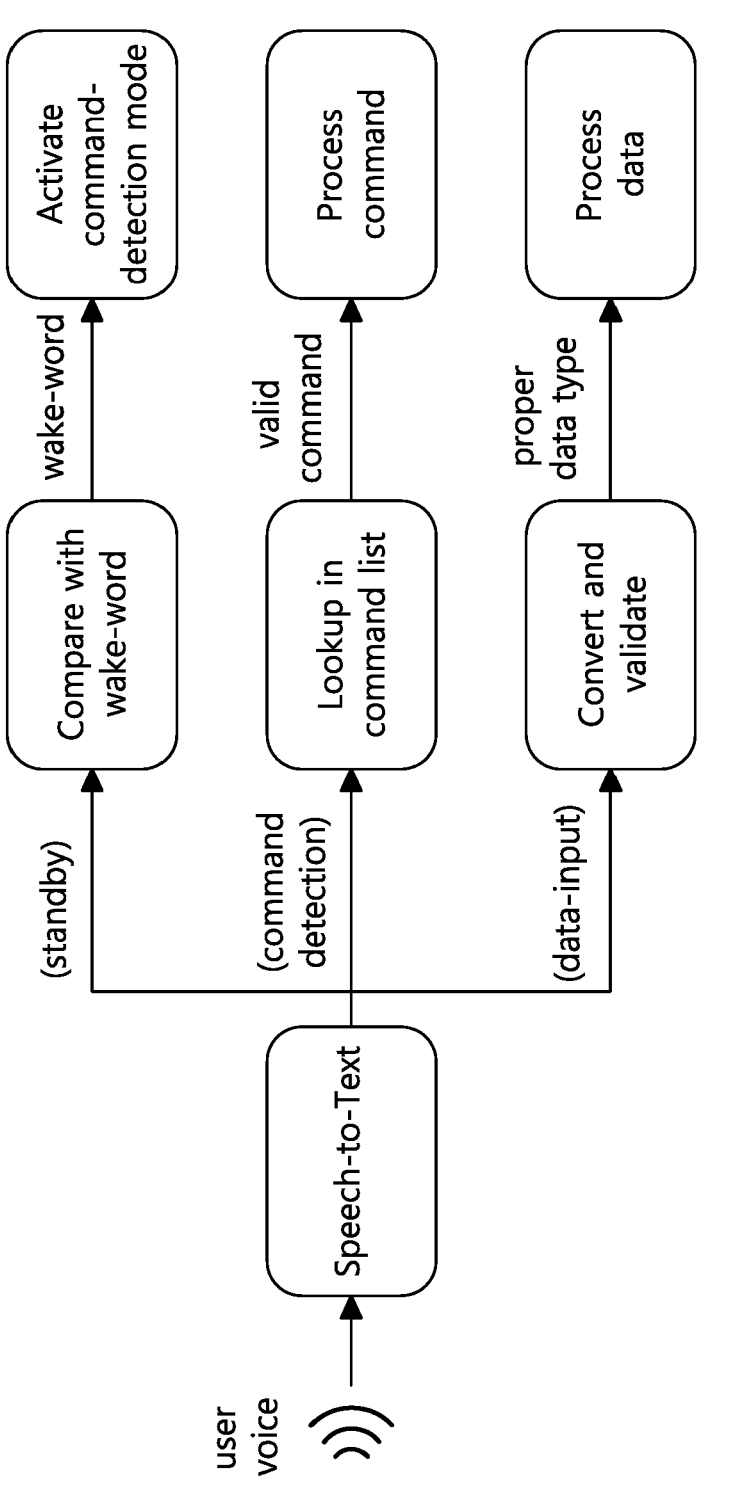
FIG. 13 illustrates cases of speech recognition and subsequent user intent processing, classified by speech reception modes of a STT component 212.

FIG. 13 illustrates specific steps of user intent processing after user speech is recognized, distinguished by the speech reception mode of the STT component 212. In each speech reception mode, the user speech captured and forwarded in text by the STT component 212 is processed by the controller 230 as follows:

In standby mode, it is compared with a predefined unique wake-word. If matched, command-detection mode is switched to; otherwise, it stays in standby mode.

In command-detection mode, it is looked-up in the list of valid commands in accordance with the current operating status of the mobile application 200. If confirmed as a valid command, the controller 230 invokes specific transactions to be processed; otherwise, a valid voice command is requested to the user.

In data entry mode, it is converted to the corresponding data type, such as a number or string, and then verified whether it is of valid data type. If verified as a valid data type, the controller 230 invokes the specific transactions to be processed; otherwise, valid data is requested to the user.

The mobile application 200 of the present invention produces synthesized speech output utilizing the TTS component 214. First, each text message to be forwarded to the TTS component 214 is created utilizing a pattern-based message template that is associated with each BPMN element type. Each parametric slot of the message template is replaced with a text fragment of relevant data fetched from the system of the present invention, such as the description of the procedure step being currently executed or stored data of user-observed or calculated value.

Then, this text message is extended with Speech Synthesis Markup Language (SSML) tags to make the speech output more natural and clear. SSML is an XML-based markup language designed to provide rich synthetic speech by controlling speech properties, such as pronunciation, volume, pitch, or speed rate, on various speech synthesis platforms.

And the output message extended with SSML tags is provided in the form of voice synthesized by the TTS component 214.

FIG. 14 illustrates the aforementioned steps along with an example of template-based message composition and synthesized speech provision using a public TTS component with an example.

The message template for notifying the user of the result of a calculation row, for instance, might be 'Calculated value for ⟨ what ⟩ is ⟨ value ⟩ '. The text snippets for the parametric slots of ⟨ what ⟩ and ⟨ value ⟩ are taken from the description of the procedure step being currently executed and the value calculated by a formula, respectively.

Assuming that the text snippets corresponding to these parametric slots are 'the gallons required to fill the tank' and '54.7' respectively, the text message would be composed as 'Calculated value for the gallons required to fill the tank is 54.7'.

This completed text message is converted into a form extended with SSML tags to generate a more natural and clear synthesized speech. For example, the tag of <break time"=0.3 s"/> is inserted for a short pause before and/or after the text snippets for parametric slots, and the tag of <say-as interpret-as="cardinal"> prior to '54.7' is for the TTS component 214 to read it as 'fifty-four point seven'.

Figure 15:
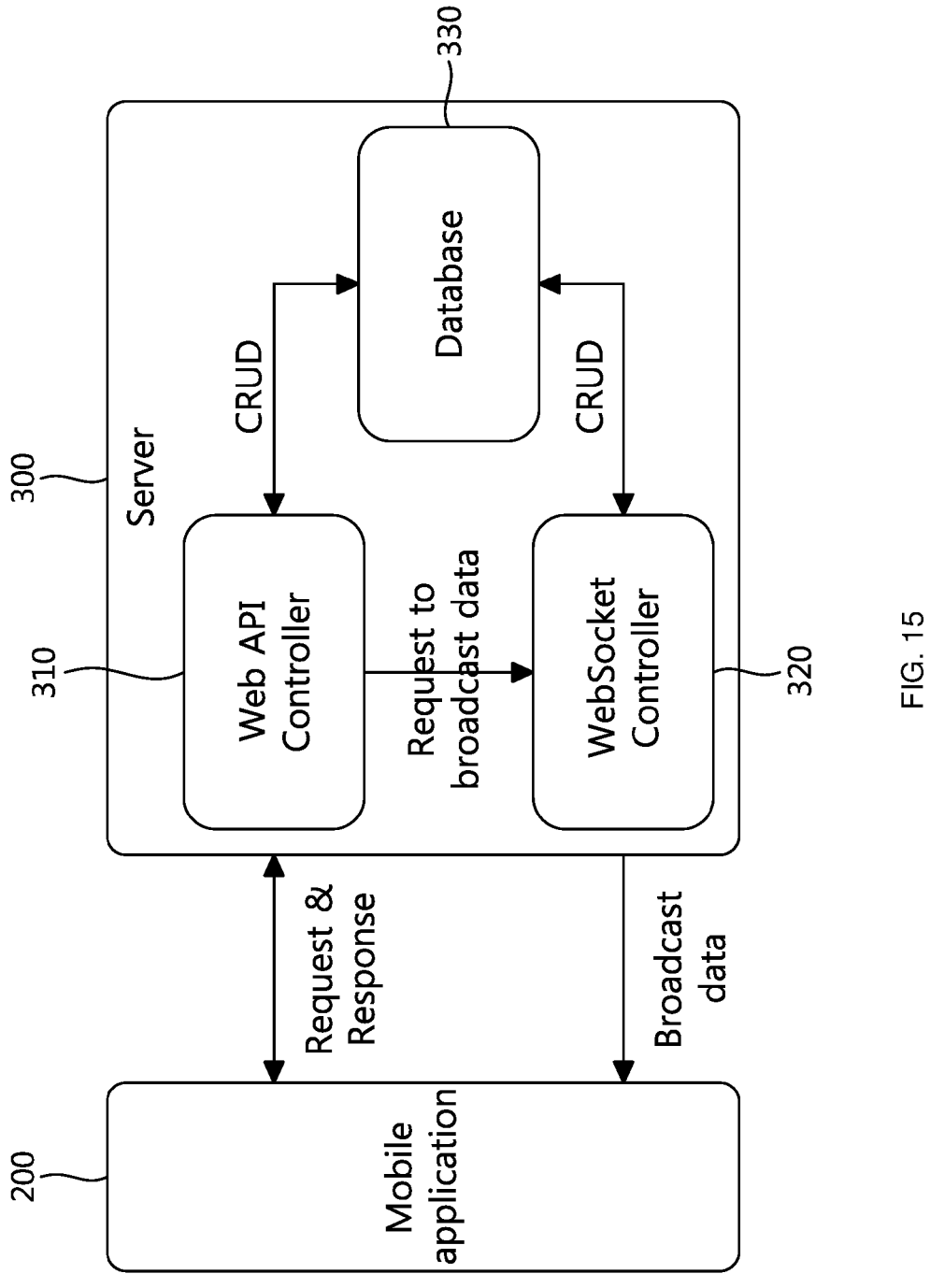
FIG. 15 illustrates a block diagram of a client-server architecture of a system including the details of a server system according to one or more examples of the present disclosure.

FIG. 15 is a block diagram of the client-server architecture of the system of the present invention, showing details of the backend server 300. As shown in FIG. 15, the server 300 providing backend services may include a Web API controller 310, a WebSocket controller 320, and a Database 330.

The Web API controller 310 receives and processes requests from mobile application clients via the HTTP protocol. In general, CRUD (create, read, update, delete) operations on the database 300 are required to process a client request. The processed result is sent back to the requesting client via the HTTP protocol. The request of the mobile application 200 and the reception of the processing result of the backend server 300 are accomplished through an application programming interface (API). If required, the Web API controller requests the WebSocket controller 320 to broadcast the result to other clients participating in the same workgroup as the requesting client.

Upon a request from the Web API controller 310, the WebSocket controller 320 broadcasts data to designated clients via the WebSocket protocol. In this simple way, constant data exchange between the server and clients is accomplished, which is not supported by the HTTP protocol.

The database 330 is for the central management of all data related to the operation of the system of the present invention. These data may include the followings: user-provided or calculated results obtained by the mobile application 200; execution status events and their time stamps for each procedure step; additional data for administrative purposes, such as user accounts; and the update status of the mobile application 200 and XML procedures as well as the folder locations of their latest versions.

Application programming interfaces (APIs) are utilized for the interactions between the mobile application 200 and the server system 300. The APIs provide back-end services of managing data in a centralized manner, allowing mobile application 200 to be simple and independently developed. Each specific API is defined for expected requests from mobile application clients. In addition to conventional APIs, for authentication and authorization, in-app version checking, or data management, etc., the server system 300 provides several unique APIs. For example, the work-order-based authorization API allows more secure management of procedure downloads and automatic role assignment for each participant in a workgroup, utilizing the work-order data pushed from an independent plant management system, such as an enterprise resource planning (ERP) system.

Frequently at a plant, several people in a workgroup collaborates on a procedure, each with a distinct role. Each activity of an action step (or its associated or attached element) is to be performed by a designated person with a specific role in that workgroup. Thus, execution control of the mobile application 200 will always be granted exclusively to a single client in a workgroup, while its execution results will be broadcast and synchronized to all other clients in that workgroup. In addition, execution control is automatically switched to the appropriate client in accordance with the work progress of the procedure.

Figure 16:
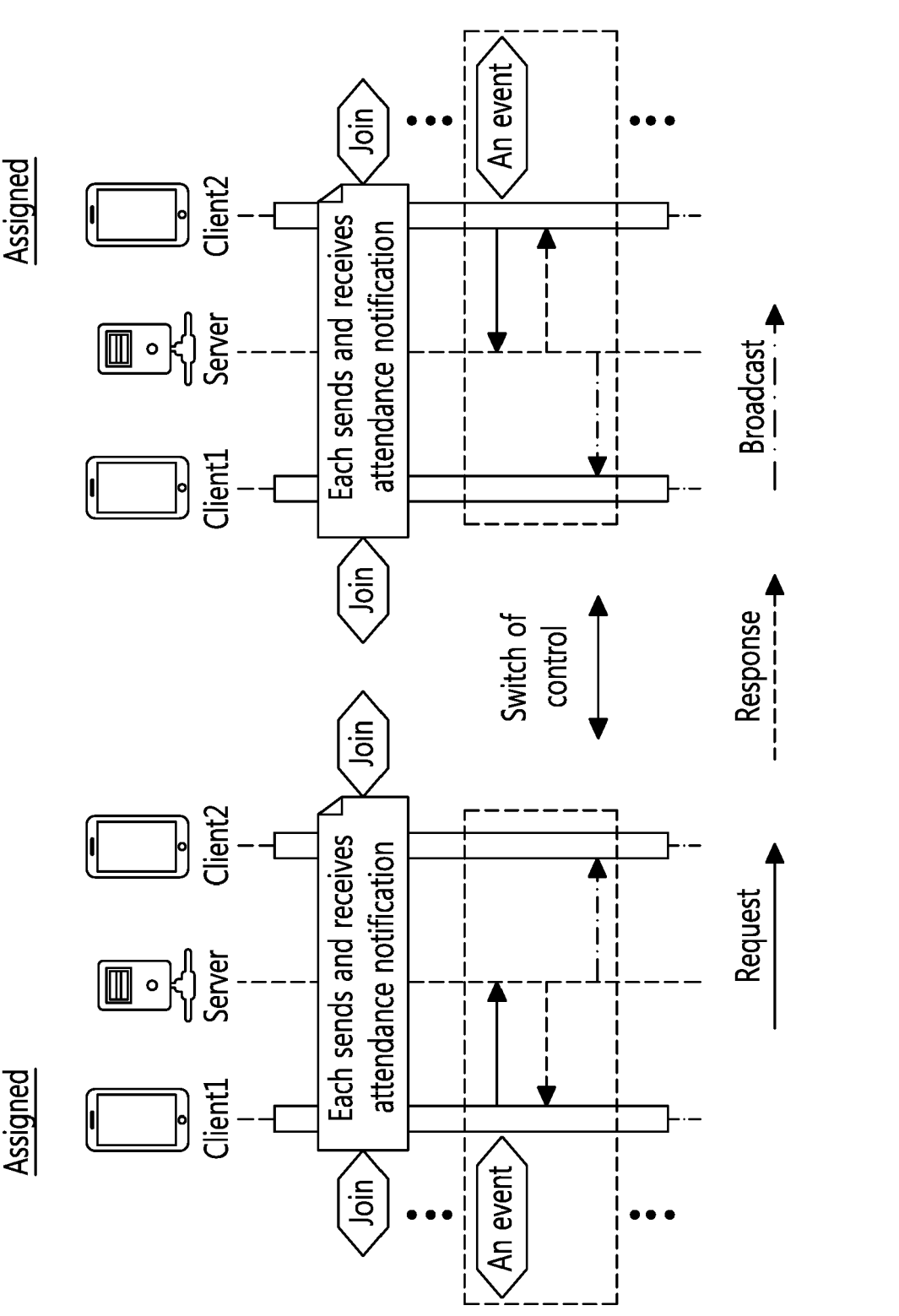
FIG. 16 illustrates a diagram showing switching of execution control and synchronization of execution results between two mobile application clients participating in the same workgroup.

FIG. 16 illustrates the automatic switch of execution control and the synchronization of execution results between two mobile application clients participating in the same workgroup.

The execution control of the mobile application 200 is exclusively assigned to Client 1 or Client 2 of FIG. 16. First, for each activity of an action step (or its associated or attached element), clients 1 and 2 both send and receive attendance notification, respectively, of themselves and of the other, that they are currently participating in the workgroup.

Any event that happened at the client responsible for the current execution is stored in the database with a timestamp and then broadcast to the other client by the server system 300, represented with three arrows inside the dashed rectangles. The origins or targets of these three different types of message arrows (i.e., Request, Response, and Broadcast) for an event are opposite depending on where it occurred. Whenever it is required according to the work progress of the procedure, the execution control of the mobile application 200 is automatically switched to another client.

The mobile application 200 of the present invention can operate even in offline mode. Execution results are temporarily stored in the smart device storage, and then uploaded in bulk when connected online to the server 300. This capability enables the system of the present invention to cope with problematic unstable situations of the communication network or the server system 300. It also allows a mobile application client to opt out of the transaction of communicating with the server system 300 when there is only one client in a workgroup.

When a mobile application client operates in offline mode, however, the synchronization of its execution results to other mobile application clients is not available. While device-to-device communication may be utilized to achieve synchronization among multiple mobile application clients operating in offline modes, a stable two-way communication is essential to facilitate real-time situational awareness of both work progress status and plant equipment status. Thus, the offline mode operation of the mobile application 200 described above is just for optional use or to cope with exceptional problematic situations.

The mobile application 200 also supports TUI-driven operation, where any execution result for a procedure step is also automatically synchronized to all other clients in the same workgroup.

The basic layout of TUI display 250 of the mobile application 200 in operation is shown in FIG. 17. Referring to FIG. 17A, the layout of the TUI display 250 is divided into a top area 251, a bottom area 252, and a central area 253.

The top area 251 consists of three rows and displays the basic information of the procedure currently being performed: ID, title, and revision number of the procedure, that are generally included in the page header of a procedure documents, along with the title of the section currently being performed. A navigation bar icon (three hyphens arranged vertically) is provided on the top first row to provide easy access to each section of the procedure. There is also a menu button (three dots arranged vertically) that provides easy access to all available menu items, including user-preference setting of the mobile application 200. Each of these displays a distinct list of selectable items in a horizontal or vertical slide-and-swipe form, respectively, on the top display layer.

The bottom area 252 consists of a single row, and prompts valid voice inputs in accordance with the operating status of the mobile application 200. At its right end, a microphone icon indicating the current speech reception mode is shown being partially overlaid on the central area 253.

Figure 17B:
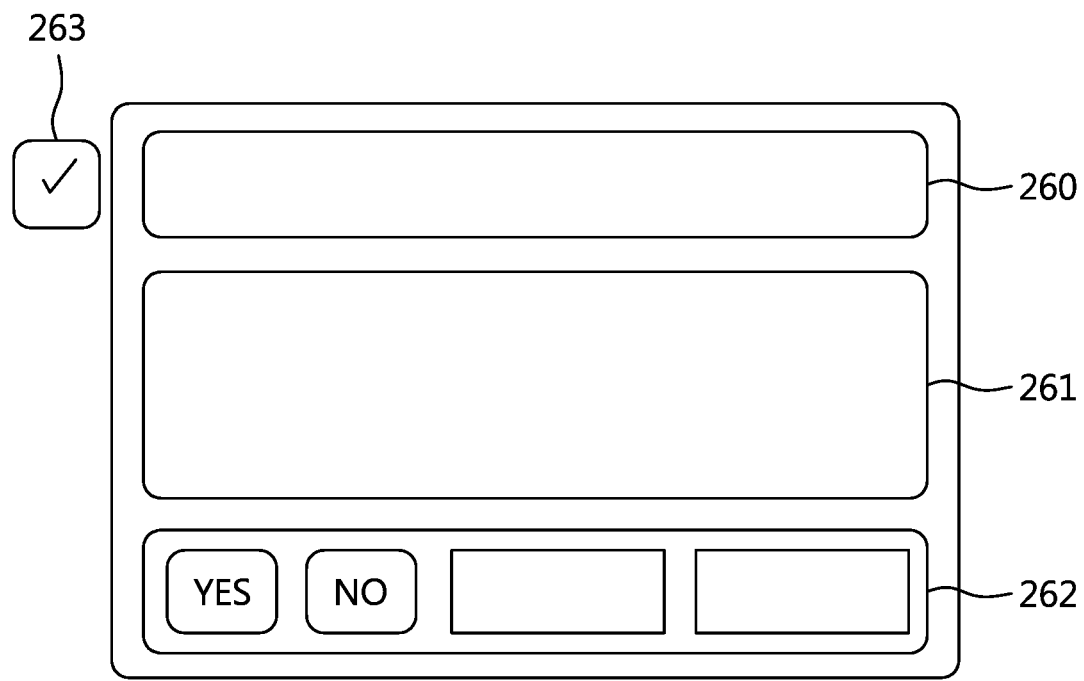
FIG. 17B illustrates the configuration of a generic card layout template composed of four containers for presenting each step of the procedure currently being performed, where each procedure step in FIG. 17A is presented utilizing the generic card layout template of FIG. 17B.

The central area 253 presents the procedure steps as a scrollable vertical list. The procedure step currently being performed is presented at the vertical center, with previously completed and subsequent procedure steps above and below, respectively, as space permits. The procedure step currently being performed is presented using a generic card layout template composed of four containers as shown in FIG. 17B: 260 for the procedure step description; 261 for optionally attached element(s) to an action step, such as a record row; 262 for clickable buttons; and 263 for a checkbox for a placekeeping purpose that is automatically ticked in accordance with the work progress of the current step and any attached elements. The generic card layout template of FIG. 17B is customized to several specific card layouts by the BPMN element types.

FIG. 18 shows examples of specific card layouts customized from the generic card layout template of FIG. 17B. Since the checkbox is used for all procedure paragraphs, it is not shown in FIG. 18.

Figure 18A:
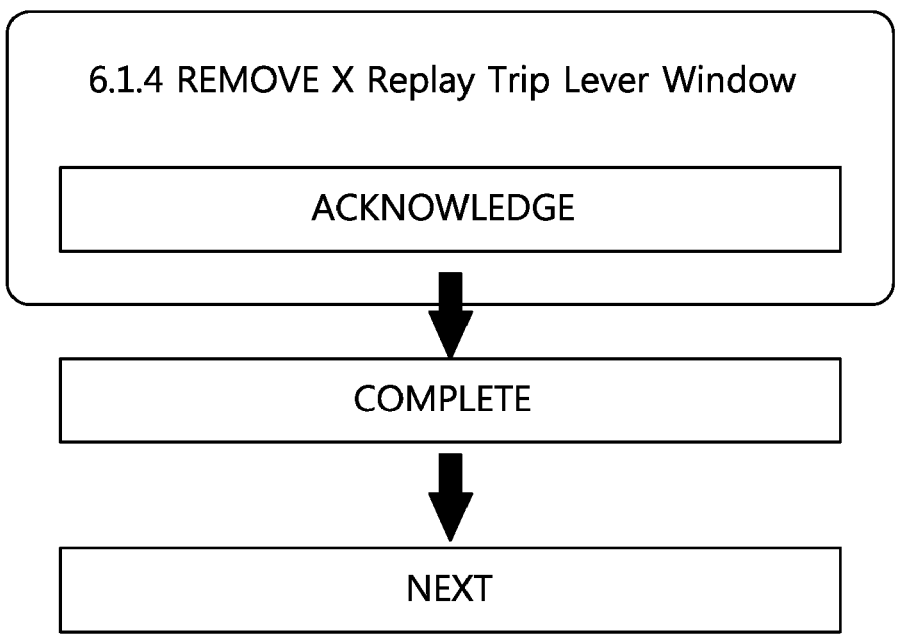
FIG. 18 illustrates examples of different card layouts, customized from the generic card layout template of FIG. 17B, according to types of procedure steps and optionally attached elements.

FIG. 18A is a card layout for a simple action step with neither a conditional clause nor an attached row. It consists of two containers: One for the step description and the other for an action button. According to the work progress of the step, triggered by voice or button clicking, the label of and the transactions to be processed by this single action button are changed in the order of 'Acknowledge', 'Complete', and 'Next'.

Figure 18B:
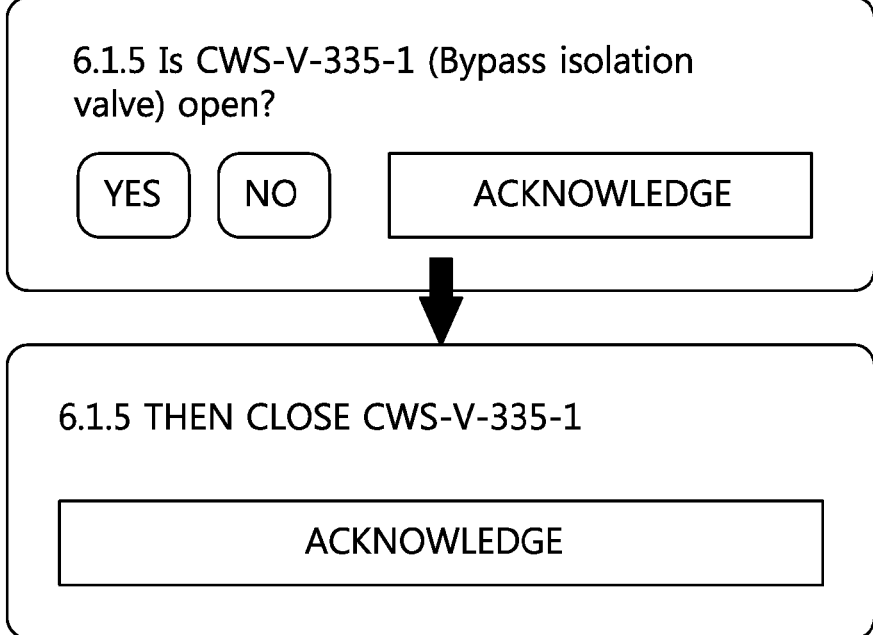

FIG. 18B is a card layout of for a conditional action step. Two distinct card layouts are utilized in turn, first for its conditional clause and then for its action clause when the condition is satisfied. For the conditional clause, its card layout consists of two containers, one for the condition description and the other for three buttons—an action button and a pair of buttons for 'YES' or 'NO'. The card layout for the action clause is similar to that in FIG. 18A.

Figure 18C:
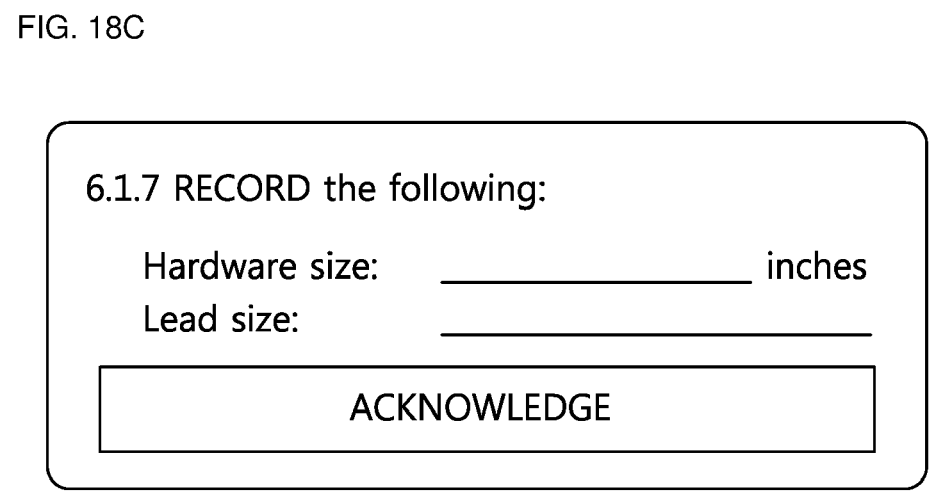

FIG. 18C is a card layout for an action step with record row(s) attached. Three containers are included, for the step description at the top, a single action button at the bottom, and one or more input text boxes for data entry in the middle. Each input text box is optionally preceded with a descriptive label and optionally succeeded with a measure unit. Input textbox(es) are filled up with the data provided by the user, via the VUI 210 or the TUI 220.

The system configuration of the present invention supports the following additional functions.

Figure 19A:
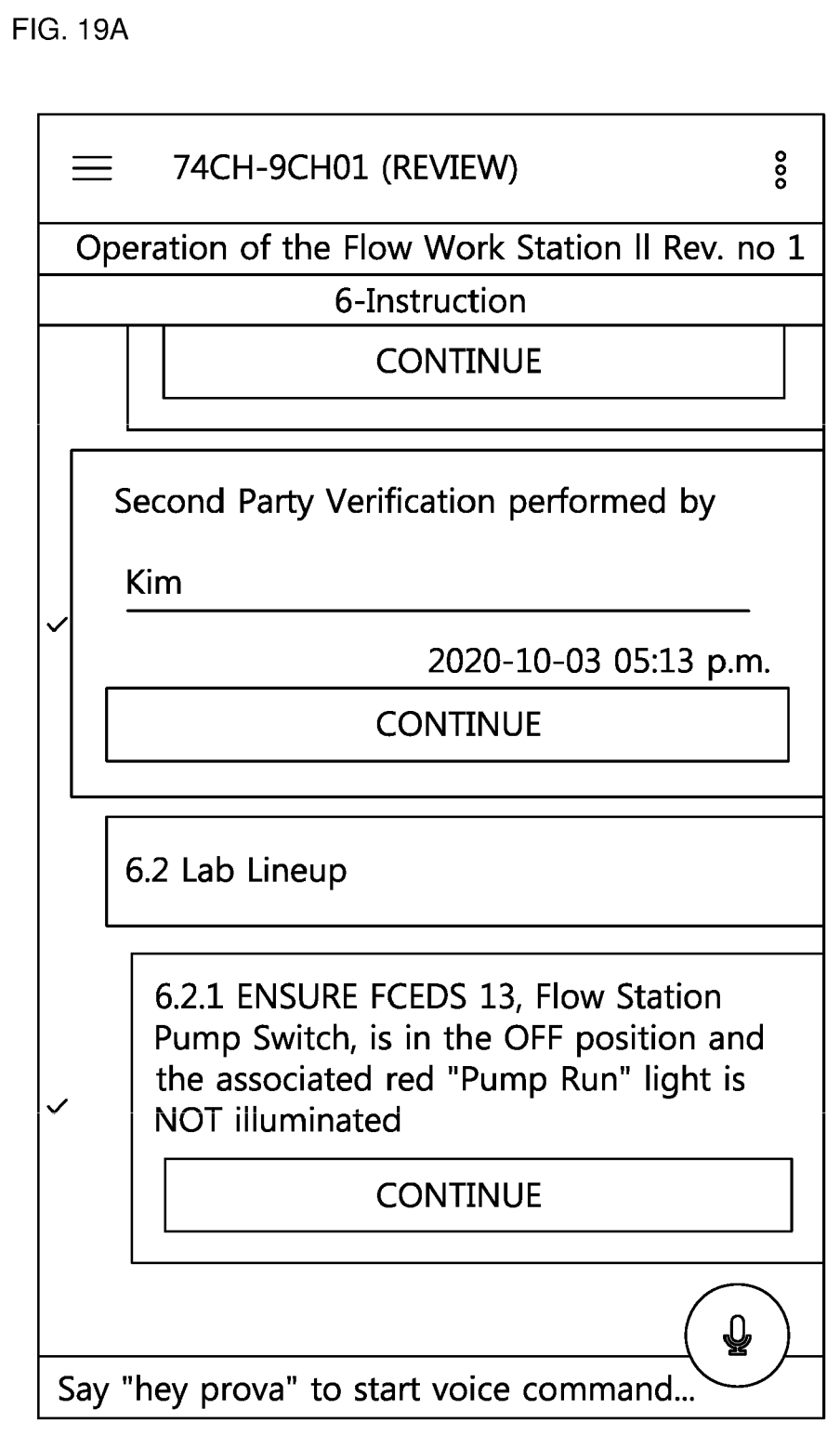

As shown in FIG. 19A, the mobile application 200 supports two additional modes for reviewing results of executed steps as well as for previewing the whole procedure, other than the mode for executing a procedure, in a read-only manner via the TUI only.

As shown in FIG. 19B, the mobile application 200 supports a night mode display useful at low light conditions, in a dark color background and bright color letters, which minimizes a temporary night blindness problem that can cause safety hazards.

Figure 19C:
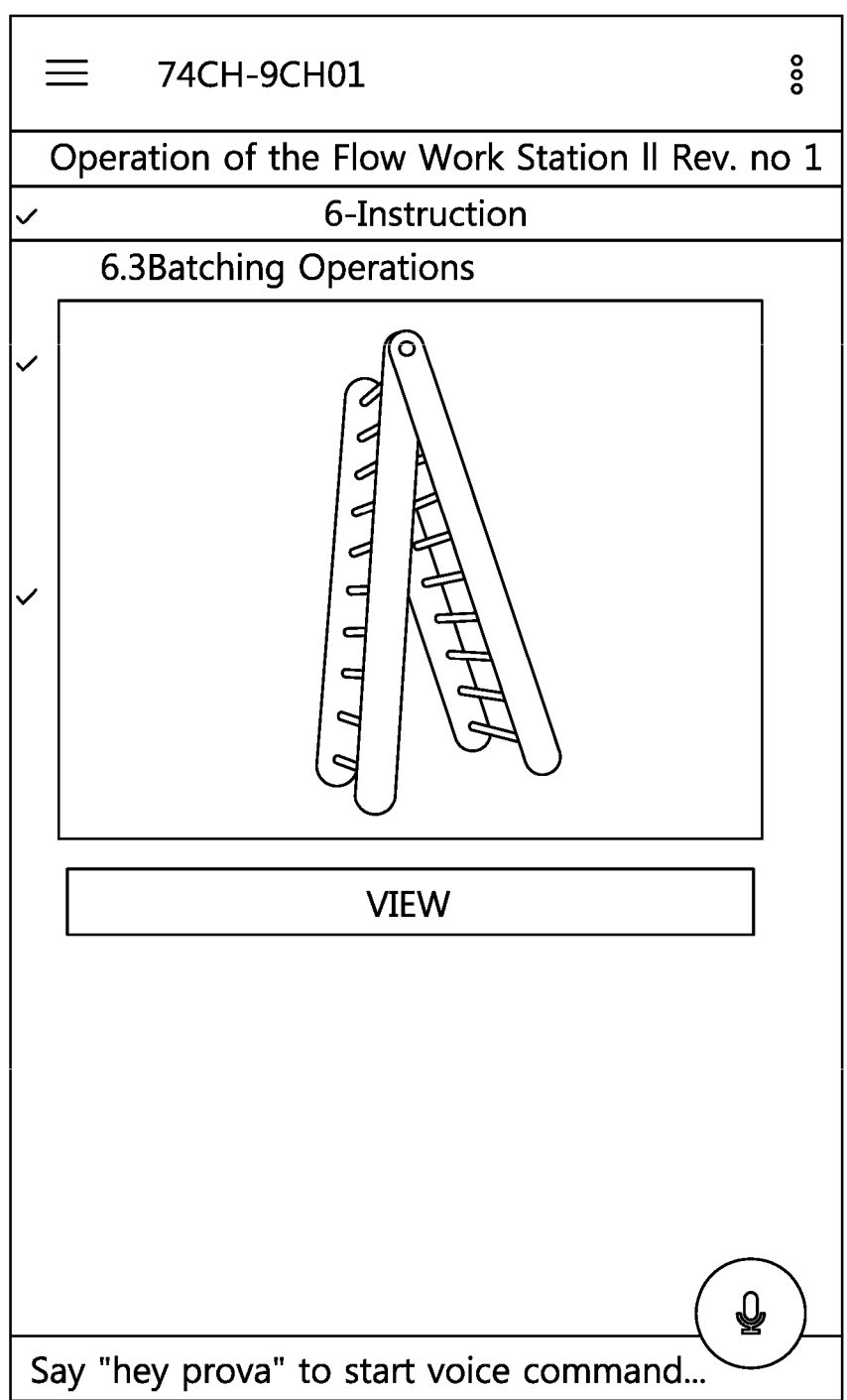

As shown in FIG. 19C, the mobile application 200 supports interactive viewing of 3D models. An open source tool, such as Android 3D Model Viewer, is used for viewing the 3D models that are downloaded only upon the request from the user.

The mobile application 200 of the present invention supports easy configuration of its operation via a separate screen. Configuration of user preference, such as speech rate, is allowed for general users. However, configuration for enhancing the adaptability of the mobile application 200 without changing its codes, are limited only to system managers. For example, different levels of detail could be defined according to the user experience by simply opting in or out some basic VUI unit in each voice interaction scenario. Each user is individually assessed by the head of a department he or she belongs.

The mobile application 200 processes only certain predefined voice commands in accordance with the current operating status of the mobile application 200. However, special voice commands are always processed on user convenience. For example, users can direct the mobile application 200 to reinstruct the current step or return to the previous one, with the voice commands of 'Again' or 'Go back', respectively. In this way, users can accurately recognize the contents of procedures and strengthen the control over the system of the present invention to improve quality of works.

The TUI display layout of the mobile application 200 is automatically adjusted according to the screen size of the device. A device with a relatively large screen, such as a tablet, enables a flexible display to view the procedure details and additional multimedia data without overlapping.

In standby mode, if a predefined wake-up word is not recognized for a certain period of time, the mobile application 200 switches to power saving mode with a dark screen. When the wake-up word is recognized, the screen display immediately returns to normal.

As described above, the present invention converts a procedure document into a smart procedure system capable of voice interfacing without using any external public services. Users can receive guidance regarding procedures being free from manipulating mobile devices. Users can also control the operation of the mobile application and enter data, such as observed values, via voice. All execution results of the mobile application are stored to the server in real time via a secure communication network. Plant safety as well as human performance of both productivity and quality could be enhanced by reducing human errors.

Meanwhile, a method in accordance with one or more embodiments of the disclosure may be embodied in a program command that may be performed through various computer means and recorded in a computer reading medium. The computer reading medium may include a program command, data file, data structure, or their combination. The program command recorded in the medium may be specifically designed and composed for the disclosure, or it may be one that is notified and usable to an operator of computer software. Examples of the computer reading medium may include a magnetic media such as a hard disk, a floppy disk, and a magnetic tape, an optical media such as CD-ROM and DVD, a magneto-optical media such as a floptical disk, and a hardware device such as ROM, RAM, and flash memory, etc. that are specifically configured to save and perform a program command. Examples of the program command may include not only a machine language code made by a complier, but also a high-level language code that may be executed by a computer with using an interpreter, etc. The above-identified hardware device may be configured to be operated as one or more software modules to perform an operation of the disclosure, and a reversed situation may be also possible.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

INDUSTRIAL APPLICABILITY

The present invention could be utilized for converting procedure documents of industrial plants operating large facilities, such as a power plant, an oil refinery, a (petro) chemical plant, a desalination plant, etc., into a smart procedure system capable of voice interfacing to improve worker productivity and work quality.

What is claimed is:

1. A system, comprising:
an internal server operated in isolation from an external public communication network; and
at least one smart device communicating with the internal server,
wherein the internal server comprises:
a pre-processing unit including a non-text processing unit configured to separate out images and tables from an input plant procedure; and
a text processing unit configured to extract structural properties and rich text features for each text paragraph of the plant procedure from which the images and tables are separated out;
an extended natural language processing (NLP) unit configured to apply existing NLP techniques by utilizing public NLP tools for each text paragraph returned from the pre-processing unit and to correct any misinterpreted NLP results, the extended NLP unit comprising:
a first NLP unit configured to perform tokenization, sentence splitting, and lemmatization on the text as input;
a second NLP unit configured to perform part-of-speech (POS) tagging for each token and hierarchical structuring of tokens for each sentence; and
a third NLP unit configured to detect and correct any misinterpreted NLP results from the output of the second NLP unit, and to utilize pattern-based built-in rules integrated with a lexical database;
an information extraction unit configured to extract all syntactic and semantic information for each text paragraph of the plant procedure by utilizing the results of the pre-processing unit and the extended NLP unit;
a conversion unit configured to convert the each text paragraph of the plant procedure into one or more individual Business Process Model and Notation (BPMN) elements and their property values by utilizing the syntactic and semantic information extracted; and a generation unit configured to generate a BPMN process model of the plant procedure in an extensible Markup Language (XML) format by integrating and restructuring the individual BPMN elements, wherein the syntactic and semantic information includes semantic elements, paragraph types, and step components, and wherein the smart device is configured such that a mobile application is installed to receive the plant procedure in the XML format, convert the plant procedure expressed in XML into a smart procedure supporting voice interfacing, and provide voice guidance of the plant procedure in response to a user's voice input.

2. The system of claim 1, wherein the mobile application comprises:

a Voice User Interface (VUI) including a Speech-to-Text (STT) and Text-to-Speech (TTS) components;

a Touch User Interface (TUI); and a controller configured to control entire operation of the mobile application including user interface functions.

3. The system of claim 2, wherein the entire operation of the mobile application, including an interface between a user and the mobile application via the VUI or the TUI, follows a predefined interaction scenario for each type of BPMN element in the process model of the plant procedure.

4. The system of claim 3, wherein proceeding to next BPMN element connected or attached by BPMN elements of a sequence flow or an association is processed in three different ways: a user-oriented way, a system-oriented way, and an automatic way, wherein a specific notification sound is provided to a user at the end of each interaction scenario for the three ways, being included as a last basic VUI, so that the user clearly recognizes that the smart device is proceeding to the next BPMN element.

5. The system of claim 2, wherein the controller controls the entire operation of the mobile application including recognizing user speech, detecting user intent, processing required transactions, or providing the processed results in synthesized speech.

6. The system of claim 2, wherein the VUI activates distinct speech input reception modes of standby, command-detection, and data-entry, switching to a specific speech reception mode according to controls of the controller, converts captured user speech into a text, and forwards the text to the controller by utilizing the STT components.

7. The system of claim 2, wherein the controller verifies whether a text forwarded from the VUI is a valid command or data type, if confirmed, the controller processes designated transactions, otherwise the controller requests the user to provide a valid voice input again, and then, the controller reactivates the STT component of the VUI to a specific speech reception mode, depending on an operating status of the mobile application, and wherein the controller utilizes no external services.

8. The system of claim 2, wherein the VUI provides guidance to the user in synthesized speech utilizing the TTS component according to the controls of the controller.

9. The system of claim 2, wherein the controller composes a text message for a voice output utilizing a pattern-based message template associated with each BPMN element type and property values of current instance of the BPMN element, extends the text message for the voice output using Speech Synthesis Markup Language (SSML) tags, and provides the text message to the user in synthesized speech via the TTS component of the VUI.

10. The system of claim 2, wherein a display screen for the TUI comprises:

a first area of three rows respectively presenting an ID, title, and section title of a plant procedure currently being performed;

a second area of a single row presenting valid or recognized user speech in text; and a third area between the first area and the second area presenting a scrollable vertical list of previously completed and subsequent plant procedure steps, ordered as in the plant procedure and centered on a plant procedure step currently being performed.

11. The system of claim 10, wherein the plant procedure step currently being performed is presented using a generic card layout template including four containers of step description, rows of optionally attached elements in case for an action step, clickable buttons, and a checkbox indicating step execution status, and wherein a specific card layout customized from the generic card layout template is used according to BPMN element type of the plant procedure step currently being performed.

12. The system of claim 11, wherein a label of an action button changes in an order of 'Acknowledge', 'Complete', and 'Next', wherein the action button is one of clickable buttons, and wherein, when the action button is clicked or corresponding user speech is recognized with the TUI or VUI respectively, different specific transactions are processed according to the label of the action button.

13. The system of claim 11, wherein a conditional action step, of a kind of the action step, includes a card layout for conditional clause and a card layout for action clause, and wherein, when the card layout for conditional clause is utilized and then a predetermined condition is satisfied, the card layout for action clause is utilized.

14. The system of claim 1, wherein the internal server and the smart device are connected through a secure communication network within a plant.

15. The system of claim 1, wherein the internal server further comprises:

a Web API controller configured to receive and process a request from the mobile application and then return a processed result to the requesting mobile application;

a WebSocket controller configured to broadcast data to a group of designated mobile application clients upon a request from the Web API controller; and a database configured to store all data related to the operation of the mobile application installed on the smart device.

16. The system of claim 15, wherein both the request from the mobile application installed on the smart device and a response of the processed result from the internal server are interfaced through an Application Programming Interface (API) that are provided at the internal server and controlled by the Web API controller.

17. The system of claim 1, wherein the internal server controls download of the plant procedure expressed in the XML format and automatically assigns roles of each mobile application client participating in a workgroup, utilizing work order data issued by a separate plant management system.

18. The system of claim 15, wherein, when multiple mobile application clients participate in a workgroup, the internal server grants execution control for any type of input exclusively to a single mobile application of a user assigned to perform a current procedure step, receives an execution status including data input at a mobile application client granted with the execution control via the Web API controller and stores the execution status in the database, and broadcasts the execution result to all other clients in the workgroup for synchronizing operation via the WebSocket controller.

19. The system of claim 1, wherein the mobile application supports:
   previewing plant procedures,
   reviewing executed results of the plant procedures;
   customizing user or system configurations via a separate screen, including changing a user preference and changing an operation of the mobile application, wherein the user preference comprises a speech speed of synthesized voice output, and the operation includes excluding a basic VUI according to scenario customization; and
   re-instructing a current step of the plant procedure and returning to a previous step of the plant procedure, each by a designated voice command.

20. A method for converting a plant procedure into a smart procedure supporting voice interfacing using a smart device and an internal server, the method comprising:
   a first step of pre-processing the plant procedure by the internal server;
   a second step of applying, by the internal server, existing natural language processing (NLP) technologies to text paragraphs returned from the first step and correcting any misinterpreted NLP results, of part-of-speech (POS) tags and parse trees of tokens, wherein the second step comprising a first NLP step of performing tokenization, sentence splitting, and lemmatization, a second NLP step of performing POS tagging and syntactic parsing, and a third NLP step of correcting any errors of the second NLP step by using a lexical database and internal rules;
   a third step of performing, by the internal server, semantic element extraction, paragraph type classification, and action step component identification for each text paragraph of the plant procedure utilizing the results of the first and the second steps;
   a fourth step of converting, by the internal server, each text paragraph of the plant procedure into one or more individual Business Process Model and Notation (BPMN) elements and property values of the individual BPMN elements by using the syntactic and semantic information extracted during the second step; and
   a fifth step of generating, by the internal server, a BPMN process model of a procedure by integrating and restructuring the individual BPMN elements in extensible Markup Language (XML);
   wherein the smart device is configured to receive the plant procedure in the XML according to a mobile application installed in advance, convert the XML-format plant procedure into the smart procedure supporting voice interfacing, and provide voice guidance of the contents of the plant procedure in response to a user's voice input.

21. The method of claim 20, wherein the internal server and the smart device are connected via a secure communication network within the plant, and the method is performed according to a predefined scenario for each type of BPMN element in the process model of the plant procedure.

22. The method of claim 21, wherein each predefined scenario includes:
   a speech recognition step of recognizing user speech;
   a user intent identification step of identifying user intent;
   a processing step of processing designated transactions according to a user intent identified; and
   a synthesized speech output step of producing a processed result in synthesized speech.

23. The method of claim 22, wherein the speech recognition step includes capturing the user speech in an active speech reception mode and then converting the user speech into a text.

24. The method of claim 23, wherein the user intent identification step includes verifying the text converted from the captured user speech based on determination on whether it is a valid command or data type.

25. The method of claim 22, wherein the synthesized speech output step including:
   a composition step of building a text message for a voice output using a pattern-based message template associated with each BPMN element type;
   an extension step of extending the output text message using Speech Synthesis Markup Language (SSML) tags; and
   a provision step of providing the extended output text message in synthesized speech via a Text-to-Speech (TTS) component of Voice User Interface (VUI).

26. The method of claim 20, further comprising:
   in order for multiple smart devices operating within a workgroup to jointly perform a single plant procedure in a harmonized manner,
   a sixth step of automatically granting an execution control for any type of input exclusively to a smart device of a worker assigned to perform a target step; and
   a seventh step of automatically synchronizing any execution result of a responsible smart device to all other smart devices in the workgroup.

* * * * *